(12) United States Patent
Mitchell et al.

(10) Patent No.: US 7,749,394 B2
(45) Date of Patent: *Jul. 6, 2010

(54) METHODS OF TREATING WATER

(75) Inventors: Michael Donovan Mitchell, Cincinnati, OH (US); Dimitris Ioannis Collias, Mason, OH (US); David William Bjorkquist, Wyoming, OH (US); Piyush Narendra Zaveri, Mason, OH (US); Matthew Morgan Woolley, Chapel Hill, NC (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/465,216

(22) Filed: May 13, 2009

(65) Prior Publication Data

US 2009/0218292 A1 Sep. 3, 2009

Related U.S. Application Data

(63) Continuation of application No. 10/705,572, filed on Nov. 11, 2003, now Pat. No. 7,614,508, which is a continuation-in-part of application No. 10/464,209, filed on Jun. 18, 2003, now abandoned, and a continuation-in-part of application No. 10/464,210, filed on Jun. 18, 2003, now Pat. No. 7,614,506, said application No. 10/464,209 is a continuation of application No. PCT/US03/05416, filed on Feb. 21, 2003, and a continuation of application No. PCT/US03/05409, filed on Feb. 21, 2003, said application No. 10/464,210 is a continuation of application No. PCT/US03/05416, filed on Feb. 21, 2003, and a continuation of application No. PCT/US03/05409, filed on Feb. 21, 2003, said application No. 10/464,209 is a continuation-in-part of application No. 09/935,962, filed on Aug. 23, 2001, now abandoned, said application No. 09/935,810, said application No. 10/464,210 is a continuation-in-part of application No. 09/935,962, filed on Aug. 23, 2001, now abandoned, and a continuation-in-part of application No. 09/935,810, filed on Aug. 23, 2001, now abandoned.

(51) Int. Cl.
| | | |
|---|---|---|
| B01D 37/00 | (2006.01) | |
| B01D 39/00 | (2006.01) | |
| B01D 39/14 | (2006.01) | |
| B01D 35/00 | (2006.01) | |
| B01D 27/00 | (2006.01) | |

(52) U.S. Cl. .................. 210/767; 210/501; 210/502.1; 210/504; 210/505; 210/506; 210/508; 210/649; 210/692; 210/694

(58) Field of Classification Search ................. 210/649, 210/650, 692, 694, 767, 266, 501, 502.1, 210/503, 504, 505, 506, 507, 508
See application file for complete search history.

(56) References Cited

U.S. PATENT DOCUMENTS

| | | |
|---|---|---|
| 25,398 A | 9/1859 | Duchamp |
| 9,622 A | 3/1881 | Best |
| 531,838 A | 1/1895 | Davis et al. |
| 543,922 A | 8/1895 | Buckley |
| 590,020 A | 9/1897 | Myers |
| 602,883 A | 4/1898 | Tyden |
| 611,691 A | 10/1898 | Langdon et al. |
| 673,722 A | 5/1901 | Moulton |
| 34,658 A | 6/1901 | Weaver |
| 826,654 A | 7/1906 | Firth |
| 963,324 A | 7/1910 | Randall |
| 967,905 A | 8/1910 | Hagg |
| 41,321 A | 4/1911 | Anderson |
| 1,043,933 A | 11/1912 | Hildebrand |
| 1,363,589 A | 12/1920 | Hartman |
| 1,539,775 A | 5/1925 | Sauer |
| 1,579,158 A | 3/1926 | Smile |
| 1,621,684 A | 3/1927 | Rabjohn et al. |
| 1,674,203 A | 6/1928 | Holz et al. |
| D76,391 S | 9/1928 | Groak |
| 1,752,060 A | 3/1930 | Burright et al. |
| 1,782,850 A | 11/1930 | Hill |
| 1,806,977 A | 5/1931 | Kenney |

| Patent No. | Date | Inventor |
|---|---|---|
| D93,910 S | 11/1934 | Camp |
| D113,679 S | 3/1939 | Neely |
| D128,316 S | 7/1941 | Roffy |
| 2,268,076 A | 12/1941 | Lawlor |
| D133,177 S | 7/1942 | Gross |
| D136,021 S | 7/1943 | Kraissl, Jr. |
| 2,335,458 A | 11/1943 | Senyal |
| 2,372,340 A | 3/1945 | Senyal |
| D143,545 S | 1/1946 | Pond et al. |
| 2,633,990 A | 4/1953 | Simpson et al. |
| D170,472 S | 9/1953 | Monsarrat |
| D173,603 S | 12/1954 | Atkinson |
| 2,701,792 A | 2/1955 | Owen |
| 2,750,080 A | 6/1956 | Blanchard et al. |
| 2,811,258 A | 10/1957 | Schleyer et al. |
| 2,987,187 A | 6/1961 | Comroe |
| D196,108 S | 8/1963 | Gerber |
| 3,184,064 A | 5/1965 | Sampson et al. |
| 3,242,073 A | 3/1966 | Guebert et al. |
| 3,268,444 A | 8/1966 | Renn |
| 3,278,560 A | 10/1966 | Gaertner |
| 3,283,040 A | 11/1966 | Stover |
| 3,314,897 A | 4/1967 | Gaertner |
| 3,333,703 A | 8/1967 | Scavuzzo |
| D208,752 S | 9/1967 | Payne |
| 3,342,335 A | 9/1967 | Gamundi et al. |
| 3,352,424 A | 11/1967 | Guebert et al. |
| 3,419,645 A | 12/1968 | Pietzka et al. |
| 3,428,089 A | 2/1969 | Kachergis |
| D216,978 S | 3/1970 | Greene |
| 3,539,009 A | 11/1970 | Kudlaty |
| 3,550,782 A | 12/1970 | Veloz |
| 3,558,276 A | 1/1971 | Otani |
| 3,572,553 A | 3/1971 | Ogden |
| 3,591,010 A | 7/1971 | Pall et al. |
| D221,850 S | 9/1971 | Anderson |
| 3,670,892 A | 6/1972 | Baerg et al. |
| 3,678,098 A | 7/1972 | Lewis et al. |
| 3,686,151 A | 8/1972 | Keim |
| 3,692,180 A | 9/1972 | LaRaus |
| 3,700,623 A | 10/1972 | Keim |
| D227,565 S | 7/1973 | Ehret |
| D227,886 S | 7/1973 | Martinez |
| D229,178 S | 11/1973 | Mixon |
| 3,770,625 A | 11/1973 | Wallis et al. |
| 3,784,649 A | 1/1974 | Buckman et al. |
| 3,814,642 A | 6/1974 | Araki et al. |
| D232,550 S | 8/1974 | Fushihara |
| 3,836,458 A | 9/1974 | Walls et al. |
| 3,847,787 A | 11/1974 | Okazaki et al. |
| 3,853,761 A | 12/1974 | McClory |
| 3,856,676 A | 12/1974 | Grimme et al. |
| D234,356 S | 2/1975 | Holben et al. |
| D234,357 S | 2/1975 | Humphrey |
| 3,871,950 A | 3/1975 | Hashina et al. |
| D234,843 S | 4/1975 | Taylor |
| D235,143 S | 5/1975 | Ehret |
| D235,206 S | 5/1975 | Bertrand |
| 3,886,093 A | 5/1975 | Dimitri |
| 3,888,958 A | 6/1975 | Juntgen et al. |
| D236,263 S | 8/1975 | Dussardier et al. |
| D236,264 S | 8/1975 | Taylor |
| D236,265 S | 8/1975 | Dussardier |
| 3,898,188 A | 8/1975 | Rembaum et al. |
| D236,829 S | 9/1975 | Berry, Jr. et al. |
| 3,931,009 A | 1/1976 | Davis |
| 3,939,074 A | 2/1976 | Bray |
| 3,950,253 A | 4/1976 | Stern |
| 3,950,267 A | 4/1976 | Arakawa et al. |
| D240,624 S | 7/1976 | MacMurray |
| D240,731 S | 7/1976 | Free et al. |
| 3,972,818 A | 8/1976 | Bokros |
| D242,043 S | 10/1976 | Corder et al. |
| D242,249 S | 11/1976 | Corder et al. |
| 4,007,114 A | 2/1977 | Ostreicher |
| 4,014,792 A | 3/1977 | Gossett et al. |
| 4,019,986 A | 4/1977 | Burris et al. |
| 4,021,343 A | 5/1977 | Tyler |
| 4,045,553 A | 8/1977 | Mitsumori et al. |
| 4,049,550 A | 9/1977 | Obidniak |
| 4,081,370 A | 3/1978 | Schmitt, Jr. et al. |
| 4,086,166 A | 4/1978 | Martin |
| D249,053 S | 8/1978 | Hansrote |
| D249,054 S | 8/1978 | Hansrote |
| D249,055 S | 8/1978 | Hansrote |
| D249,057 S | 8/1978 | Hansrote |
| 4,110,219 A | 8/1978 | Maples |
| D249,275 S | 9/1978 | Mackay et al. |
| D249,701 S | 9/1978 | Maples et al. |
| D251,380 S | 3/1979 | Casamitjana |
| 4,147,631 A | 4/1979 | Deines et al. |
| 4,152,262 A | 5/1979 | Rose |
| 4,172,796 A | 10/1979 | Corder |
| D253,715 S | 12/1979 | Emery |
| 4,181,694 A | 1/1980 | Hashino et al. |
| 4,190,532 A | 2/1980 | Halbfoster |
| 4,190,537 A | 2/1980 | Tondreau et al. |
| 4,205,055 A | 5/1980 | Maire et al. |
| D256,944 S | 9/1980 | Fox, Jr. |
| 4,252,650 A | 2/1981 | Mas et al. |
| D258,462 S | 3/1981 | Mixon |
| 4,277,333 A | 7/1981 | Coppola |
| 4,283,283 A | 8/1981 | Zimmerman |
| 4,292,417 A | 9/1981 | Ishii et al. |
| 4,305,782 A | 12/1981 | Ostreicher et al. |
| 4,309,247 A | 1/1982 | Hou et al. |
| 4,321,288 A | 3/1982 | Ostreicher |
| 4,340,479 A | 7/1982 | Pall |
| 4,340,480 A | 7/1982 | Pall et al. |
| 4,352,884 A | 10/1982 | Nakashima et al. |
| 4,361,486 A | 11/1982 | Hou et al. |
| 4,366,068 A | 12/1982 | Ostreicher et al. |
| 4,368,123 A | 1/1983 | Stanley |
| D268,866 S | 5/1983 | Desai et al. |
| 4,389,311 A | 6/1983 | La Freniere |
| 4,391,712 A | 7/1983 | Tyler et al. |
| 4,396,512 A | 8/1983 | Beauman et al. |
| 4,399,035 A | 8/1983 | Nohmi et al. |
| 4,430,226 A | 2/1984 | Hedge et al. |
| 4,434,206 A | 2/1984 | Fukuda et al. |
| 4,448,695 A | 5/1984 | Gordon, Jr. et al. |
| D274,930 S | 7/1984 | Joe |
| 4,473,474 A | 9/1984 | Ostreicher et al. |
| 4,482,641 A | 11/1984 | Wennerberg |
| 4,504,389 A | 3/1985 | Rundzaitis |
| D278,650 S | 4/1985 | Slovak et al. |
| 4,515,692 A | 5/1985 | Chandler et al. |
| 4,523,995 A | 6/1985 | Pall et al. |
| 4,552,863 A | 11/1985 | Fujimori |
| D282,767 S | 2/1986 | Shofner |
| 4,572,785 A | 2/1986 | Braaten |
| 4,573,464 A | 3/1986 | Yo |
| 4,576,929 A | 3/1986 | Shimazaki |
| 4,578,150 A | 3/1986 | Hou |
| 4,585,554 A | 4/1986 | Burrows |
| 4,595,497 A | 6/1986 | Burrows |
| 4,606,828 A | 8/1986 | Wells |
| 4,609,466 A | 9/1986 | McCausland et al. |
| 4,623,451 A | 11/1986 | Oliver |
| 4,623,467 A | 11/1986 | Hamlin |
| 4,626,346 A | 12/1986 | Hall |
| D288,115 S | 2/1987 | McCausland et al. |
| 4,645,567 A | 2/1987 | Hou et al. |
| 4,654,075 A | 3/1987 | Cipollini |
| D289,429 S | 4/1987 | Thumberger |
| 4,657,674 A | 4/1987 | Burrows |

| Patent No. | Date | Name |
|---|---|---|
| D290,386 S | 6/1987 | Padilla |
| D290,638 S | 6/1987 | Bishop |
| 4,670,144 A | 6/1987 | McCausland et al. |
| 4,670,482 A | 6/1987 | Dilling |
| 4,673,504 A | 6/1987 | Ostreicher et al. |
| 4,678,565 A | 7/1987 | Norton |
| 4,681,677 A | 7/1987 | Kuh et al. |
| 4,683,054 A | 7/1987 | Turnbull |
| 4,686,037 A | 8/1987 | Lang |
| 4,695,375 A | 9/1987 | Tyler |
| 4,696,742 A | 9/1987 | Shimazaki |
| D292,429 S | 10/1987 | Spink |
| 4,698,164 A | 10/1987 | Ellis |
| 4,704,324 A | 11/1987 | Davis et al. |
| 4,708,803 A | 11/1987 | Ostreicher et al. |
| D293,367 S | 12/1987 | Spink |
| 4,722,964 A | 2/1988 | Chan et al. |
| 4,734,208 A | 3/1988 | Pall et al. |
| 4,734,394 A | 3/1988 | Kosaka et al. |
| D295,887 S | 5/1988 | Hopkins |
| D296,000 S | 5/1988 | Padilla |
| 4,743,366 A | 5/1988 | Burrows |
| 4,744,895 A | 5/1988 | Gales et al. |
| D296,352 S | 6/1988 | Luzenberg |
| D296,463 S | 6/1988 | Padilla |
| 4,749,484 A | 6/1988 | Greenhut |
| 4,752,389 A | 6/1988 | Burrows |
| 4,759,844 A | 7/1988 | Lipschultz et al. |
| D297,349 S | 8/1988 | Kronsbein |
| 4,769,148 A | 9/1988 | Fibiger et al. |
| 4,772,455 A | 9/1988 | Izumi et al. |
| 4,772,508 A | 9/1988 | Brassell |
| 4,775,465 A | 10/1988 | Burrows |
| 4,776,952 A | 10/1988 | Burrows |
| 4,778,596 A | 10/1988 | Linder et al. |
| 4,808,302 A | 2/1989 | Beall, Jr. |
| 4,816,149 A | 3/1989 | Wekell |
| 4,822,765 A | 4/1989 | Nishimura |
| 4,828,698 A | 5/1989 | Jewell et al. |
| 4,830,223 A | 5/1989 | Priest |
| 4,830,744 A | 5/1989 | Burrows |
| 4,831,011 A | 5/1989 | Oikawa et al. |
| D301,913 S | 6/1989 | Brown et al. |
| 4,842,724 A | 6/1989 | Bray et al. |
| 4,853,117 A | 8/1989 | Burrows |
| 4,859,340 A | 8/1989 | Hou et al. |
| D303,703 S | 9/1989 | Padilla et al. |
| D304,363 S | 10/1989 | Ruesch |
| 4,879,027 A | 11/1989 | Sanders |
| 4,880,535 A | 11/1989 | Burrows |
| 4,885,081 A | 12/1989 | Oliver |
| 4,885,085 A | 12/1989 | Beall, Jr. |
| D306,754 S | 3/1990 | Petrucci et al. |
| D307,173 S | 4/1990 | Boehnke |
| 4,915,839 A | 4/1990 | Marinaccio et al. |
| D307,933 S | 5/1990 | Baer |
| 4,923,091 A | 5/1990 | Sutera |
| 4,936,984 A | 6/1990 | Blandford et al. |
| D309,487 S | 7/1990 | Lieberman |
| D309,494 S | 7/1990 | Riley |
| 4,946,600 A | 8/1990 | Shin |
| 4,968,440 A | 11/1990 | Woodruff |
| 4,969,991 A | 11/1990 | Valadez |
| 4,969,996 A | 11/1990 | Hankammer |
| D312,679 S | 12/1990 | Carrano et al. |
| 4,978,650 A | 12/1990 | Coughlin et al. |
| D314,226 S | 1/1991 | Devine et al. |
| 4,981,591 A | 1/1991 | Ostreicher |
| 4,983,288 A | 1/1991 | Karbachsch et al. |
| 4,983,717 A | 1/1991 | Yamasaki et al. |
| D314,607 S | 2/1991 | Kapec et al. |
| 4,994,184 A | 2/1991 | Thalmann et al. |
| 4,997,553 A | 3/1991 | Clack |
| 5,004,535 A | 4/1991 | Bosko et al. |
| 5,017,292 A | 5/1991 | DiLeo et al. |
| 5,024,764 A | 6/1991 | Holler |
| D318,092 S | 7/1991 | Ferguson |
| D318,093 S | 7/1991 | Ferguson |
| D318,315 S | 7/1991 | Sanborn |
| 5,035,802 A | 7/1991 | Yamasaki et al. |
| D319,288 S | 8/1991 | Spokoiny |
| 5,037,547 A | 8/1991 | Burrows |
| 5,037,550 A | 8/1991 | Montagnon et al. |
| 5,039,402 A | 8/1991 | Himelstein |
| D319,864 S | 9/1991 | Geneve et al. |
| 5,049,270 A | 9/1991 | Carrano et al. |
| 5,051,189 A | 9/1991 | Farrah |
| D321,550 S | 11/1991 | Laughlen et al. |
| 5,068,030 A | 11/1991 | Chen |
| 5,069,782 A | 12/1991 | Moyher, Jr. et al. |
| D323,017 S | 1/1992 | Bernstein |
| D323,203 S | 1/1992 | Pedersen |
| 5,078,864 A | 1/1992 | Whittier |
| 5,082,557 A | 1/1992 | Grayson et al. |
| 5,083,442 A | 1/1992 | Vlock |
| 5,091,164 A | 2/1992 | Takabatake |
| D324,721 S | 3/1992 | Kapec et al. |
| 5,106,500 A | 4/1992 | Hembree et al. |
| 5,108,590 A | 4/1992 | DiSanto |
| 5,110,468 A | 5/1992 | Miyashita et al. |
| 5,111,966 A | 5/1992 | Fridman |
| 5,112,477 A | 5/1992 | Hamlin |
| 5,114,042 A | 5/1992 | Sutera |
| 5,116,502 A | 5/1992 | Ferguson |
| D326,706 S | 6/1992 | Karlsson |
| 5,122,265 A | 6/1992 | Mora et al. |
| 5,128,034 A | 7/1992 | Kool |
| 5,128,036 A | 7/1992 | Svensson |
| 5,131,277 A | 7/1992 | Birdsong et al. |
| 5,133,878 A | 7/1992 | Gisell et al. |
| D328,777 S | 8/1992 | Thalmann et al. |
| 5,143,889 A | 9/1992 | Takahiro et al. |
| 5,147,533 A | 9/1992 | Lipshultz et al. |
| D330,587 S | 10/1992 | Seeley |
| 5,160,608 A | 11/1992 | Norton |
| D331,446 S | 12/1992 | Gidman |
| D332,131 S | 12/1992 | Chez |
| 5,183,607 A | 2/1993 | Beall et al. |
| 5,187,237 A | 2/1993 | Nordmann et al. |
| 5,188,727 A | 2/1993 | Kurth et al. |
| 5,189,092 A | 2/1993 | Koslow |
| 5,193,892 A | 3/1993 | Swindell |
| 5,203,803 A | 4/1993 | Schoenmeyr |
| 5,204,310 A | 4/1993 | Tolles et al. |
| D336,760 S | 6/1993 | Raunkjaer |
| 5,223,132 A | 6/1993 | Yoon |
| 5,227,238 A | 7/1993 | Hirai et al. |
| 5,232,590 A | 8/1993 | Reid |
| 5,238,559 A | 8/1993 | Nieweg |
| 5,238,570 A | 8/1993 | Hugi et al. |
| 5,248,417 A | 9/1993 | Reid |
| D340,967 S | 11/1993 | Muir |
| 5,261,792 A | 11/1993 | Schoenmeyr |
| 5,268,093 A | 12/1993 | Hembree et al. |
| 5,277,805 A | 1/1994 | Ferguson |
| 5,281,309 A | 1/1994 | Greene |
| D344,322 S | 2/1994 | Kasner et al. |
| 5,282,972 A | 2/1994 | Hanna et al. |
| 5,290,442 A | 3/1994 | Clack |
| 5,296,148 A | 3/1994 | Colangelo et al. |
| D347,462 S | 5/1994 | Douglas |
| 5,308,703 A | 5/1994 | Tsujimoto et al. |
| 5,310,593 A | 5/1994 | Tsujimoto et al. |
| 5,316,673 A | 5/1994 | Kohlmann et al. |
| 5,322,625 A | 6/1994 | Rise |
| 5,324,424 A | 6/1994 | Hochgatterer |

| | | | | | |
|---|---|---|---|---|---|
| 5,324,434 A | 6/1994 | Oikawa et al. | 5,670,124 A | 9/1997 | Itoga et al. |
| 5,328,613 A | 7/1994 | Beall et al. | 5,676,824 A | 10/1997 | Jeon et al. |
| 5,331,037 A | 7/1994 | Koslow | 5,679,243 A | 10/1997 | Cho |
| D350,870 S | 9/1994 | Hansen | 5,679,248 A | 10/1997 | Blaney |
| D351,014 S | 9/1994 | Hansen | 5,681,459 A | 10/1997 | Bowman |
| 5,348,647 A | 9/1994 | Chen | D386,242 S | 11/1997 | Clack et al. |
| 5,349,992 A | 9/1994 | Gallo et al. | 5,686,893 A | 11/1997 | Jeon |
| 5,356,531 A | 10/1994 | Rantz | 5,688,588 A | 11/1997 | Cotton et al. |
| D352,200 S | 11/1994 | Hansen | 5,698,091 A | 12/1997 | Kuennen et al. |
| 5,368,197 A | 11/1994 | Sutera | 5,702,498 A | 12/1997 | Huang |
| D353,440 S | 12/1994 | Ito et al. | D389,004 S | 1/1998 | Hampshire et al. |
| 5,371,221 A | 12/1994 | Sipos et al. | 5,705,067 A | 1/1998 | Sumi et al. |
| 5,376,279 A | 12/1994 | Judd et al. | 5,705,269 A | 1/1998 | Pimenov et al. |
| 5,393,419 A | 2/1995 | Tiede et al. | 5,707,518 A | 1/1998 | Coates et al. |
| D356,625 S | 3/1995 | Petrucci et al. | 5,709,794 A | 1/1998 | Emmons et al. |
| 5,395,509 A | 3/1995 | Guerra Cisneros et al. | D390,629 S | 2/1998 | Ullmann |
| D357,058 S | 4/1995 | Engelhard | 5,715,699 A | 2/1998 | Coates et al. |
| D358,460 S | 5/1995 | Wren | 5,730,863 A | 3/1998 | Howlings et al. |
| D358,868 S | 5/1995 | Hembree et al. | 5,744,236 A | 4/1998 | Rohrbach et al. |
| D360,332 S | 7/1995 | Mann | 5,750,026 A | 5/1998 | Gadkaree et al. |
| 5,431,813 A | 7/1995 | Daniels | 5,755,957 A | 5/1998 | Jeon |
| 5,435,909 A | 7/1995 | Burrows | D395,705 S | 6/1998 | Ediger et al. |
| 5,443,739 A | 8/1995 | Vogel et al. | 5,762,787 A | 6/1998 | Park et al. |
| 5,445,729 A | 8/1995 | Monroe et al. | 5,762,797 A | 6/1998 | Patrick et al. |
| 5,446,005 A | 8/1995 | Endo | 5,766,453 A | 6/1998 | Morellato et al. |
| 5,447,626 A | 9/1995 | Ido | 5,772,896 A | 6/1998 | Denkewicz et al. |
| 5,449,456 A | 9/1995 | Bowman | 5,773,143 A | 6/1998 | Vermillion et al. |
| D363,760 S | 10/1995 | Morem et al. | 5,776,339 A | 7/1998 | Ha et al. |
| 5,454,944 A | 10/1995 | Clack | 5,776,385 A | 7/1998 | Gadkaree et al. |
| 5,460,792 A | 10/1995 | Rosenbaum | 5,785,848 A | 7/1998 | Strand |
| 5,464,531 A | 11/1995 | Greene | 5,795,475 A | 8/1998 | Luedke et al. |
| 5,466,378 A | 11/1995 | Dussert et al. | 5,795,843 A | 8/1998 | Endo |
| 5,468,387 A | 11/1995 | Solomon | D398,367 S | 9/1998 | Andrepont et al. |
| 5,478,465 A | 12/1995 | Larson et al. | 5,800,707 A | 9/1998 | Mehnert et al. |
| 5,487,917 A | 1/1996 | Gadkaree | 5,804,280 A | 9/1998 | Pall et al. |
| 5,502,978 A | 4/1996 | Field | 5,813,245 A | 9/1998 | Coates et al. |
| 5,505,120 A | 4/1996 | Albertson | 5,813,246 A | 9/1998 | Oh |
| 5,518,613 A | 5/1996 | Koczur et al. | 5,817,231 A | 10/1998 | Souza |
| 5,521,008 A | 5/1996 | Lieberman et al. | 5,817,237 A | 10/1998 | Lee et al. |
| D370,521 S | 6/1996 | Archer et al. | 5,833,849 A | 11/1998 | Primdahl |
| 5,525,214 A | 6/1996 | Koczur et al. | 5,834,114 A | 11/1998 | Economy et al. |
| 5,527,451 A | 6/1996 | Hembree et al. | D402,745 S | 12/1998 | Termeer et al. |
| D372,295 S | 7/1996 | Weber | D403,406 S | 12/1998 | Douglas |
| 5,536,394 A | 7/1996 | Lund et al. | 5,853,572 A | 12/1998 | Kuennen et al. |
| 5,536,395 A | 7/1996 | Kuennen et al. | 5,855,788 A | 1/1999 | Everhart et al. |
| 5,536,396 A | 7/1996 | Mudra et al. | 5,855,796 A | 1/1999 | Joung |
| D372,515 S | 8/1996 | Douglas | D405,156 S | 2/1999 | Vanderhoef |
| D372,760 S | 8/1996 | Brancazio et al. | D405,867 S | 2/1999 | Denkewicz, Jr. et al. |
| 5,543,054 A | 8/1996 | Charkoudian et al. | D405,868 S | 2/1999 | Denkewicz, Jr. et al. |
| 5,560,393 A | 10/1996 | Clack | D406,314 S | 3/1999 | Denkewicz, Jr. et al. |
| 5,562,824 A | 10/1996 | Magnusson | D407,462 S | 3/1999 | Bishop et al. |
| 5,565,100 A | 10/1996 | Deng | 5,882,507 A | 3/1999 | Tanner et al. |
| 5,567,311 A | 10/1996 | Jang | D409,715 S | 5/1999 | Cruz et al. |
| 5,580,444 A | 12/1996 | Burrows | 5,900,138 A | 5/1999 | Moretto |
| 5,582,717 A | 12/1996 | Di Santo | 5,900,141 A | 5/1999 | Takigawa et al. |
| 5,587,089 A | 12/1996 | Vogel et al. | 5,900,143 A | 5/1999 | Dalton et al. |
| D377,388 S | 1/1997 | Weber et al. | 5,904,854 A | 5/1999 | Shmidt et al. |
| D377,515 S | 1/1997 | Hembree et al. | D410,726 S | 6/1999 | Cook |
| 5,607,595 A | 3/1997 | Hiasa et al. | 5,907,958 A | 6/1999 | Coates et al. |
| D378,883 S | 4/1997 | Magnusson | 5,922,378 A | 7/1999 | Kagan et al. |
| 5,620,790 A | 4/1997 | Holzki et al. | 5,922,803 A | 7/1999 | Koslow et al. |
| 5,626,749 A | 5/1997 | Lambert et al. | 5,928,503 A | 7/1999 | Shang-Chun |
| 5,639,374 A | 6/1997 | Monroe et al. | 5,928,506 A | 7/1999 | Bae |
| 5,643,444 A | 7/1997 | Garrigues et al. | 5,928,588 A | 7/1999 | Chen et al. |
| 5,645,719 A | 7/1997 | Ha et al. | 5,935,426 A | 8/1999 | Giordano et al. |
| 5,645,720 A | 7/1997 | Godines | 5,957,034 A | 9/1999 | Sham et al. |
| 5,656,160 A | 8/1997 | Parise et al. | 5,957,339 A | 9/1999 | Deni et al. |
| 5,658,372 A | 8/1997 | Gadkaree | 5,972,253 A | 10/1999 | Kimber |
| 5,658,457 A | 8/1997 | Schoenmeyr | D416,307 S | 11/1999 | Williams |
| D383,192 S | 9/1997 | Johnson | 5,976,363 A | 11/1999 | Monroe et al. |
| 5,662,779 A | 9/1997 | Greene et al. | 5,989,425 A | 11/1999 | Yonezawa et al. |
| 5,662,792 A | 9/1997 | Suh | 5,989,736 A | 11/1999 | Lintz et al. |
| 5,665,224 A | 9/1997 | Levene et al. | 5,990,041 A | 11/1999 | Chung et al. |

| | | |
|---|---|---|
| 5,992,684 A | 11/1999 | Russell |
| D418,198 S | 12/1999 | Bainton |
| 5,997,734 A | 12/1999 | Koski et al. |
| 6,001,249 A | 12/1999 | Bailey et al. |
| 6,013,180 A | 1/2000 | Wang |
| D421,089 S | 2/2000 | Fujita et al. |
| 6,024,899 A | 2/2000 | Peng et al. |
| 6,030,698 A | 2/2000 | Burchell et al. |
| D422,679 S | 4/2000 | Burrows |
| 6,045,694 A | 4/2000 | Wang et al. |
| D424,660 S | 5/2000 | Teran et al. |
| 6,057,262 A | 5/2000 | Derbyshire et al. |
| D426,418 S | 6/2000 | Norvell et al. |
| 6,077,588 A | 6/2000 | Koslow et al. |
| D429,943 S | 8/2000 | Yu |
| 6,099,735 A | 8/2000 | Kelada |
| 6,103,114 A | 8/2000 | Tanner et al. |
| 6,120,682 A | 9/2000 | Cook |
| 6,120,683 A | 9/2000 | Reinhart et al. |
| 6,120,685 A | 9/2000 | Carlson et al. |
| 6,123,837 A | 9/2000 | Wadsworth et al. |
| 6,123,844 A | 9/2000 | Haney |
| 6,139,726 A | 10/2000 | Greene |
| 6,145,670 A | 11/2000 | Risser |
| 6,155,432 A | 12/2000 | Wilson et al. |
| 6,177,319 B1 | 1/2001 | Cheng |
| D437,402 S | 2/2001 | Gieseke et al. |
| D437,913 S | 2/2001 | Adam et al. |
| D438,282 S | 2/2001 | Liu |
| D440,255 S | 4/2001 | Dickson |
| 6,214,224 B1 | 4/2001 | Farley |
| 6,228,255 B1 | 5/2001 | Peterson et al. |
| 6,228,803 B1 | 5/2001 | Gadkaree et al. |
| 6,241,893 B1 | 6/2001 | Levy |
| 6,241,899 B1 | 6/2001 | Ramos |
| 6,245,229 B1 | 6/2001 | Kool et al. |
| 6,258,265 B1 | 7/2001 | Jones |
| 6,258,266 B1 | 7/2001 | Riback et al. |
| 6,264,830 B1 | 7/2001 | Plester et al. |
| D446,840 S | 8/2001 | Strand |
| 6,270,658 B1 | 8/2001 | Plüss |
| 6,270,822 B1 | 8/2001 | Frazier |
| 6,274,041 B1 | 8/2001 | Williamson et al. |
| D449,758 S | 10/2001 | Norvell et al. |
| 6,303,031 B1 | 10/2001 | Senner |
| 6,328,881 B1 | 12/2001 | Larkner et al. |
| 6,337,015 B1 | 1/2002 | Poirier |
| D454,615 S | 3/2002 | Neal |
| 6,361,686 B1 | 3/2002 | Conrad |
| 6,370,884 B1 | 4/2002 | Kelada |
| 6,391,191 B2 | 5/2002 | Conrad |
| 6,402,949 B1 | 6/2002 | Banks |
| 6,423,212 B1 | 7/2002 | Bosko |
| 6,428,687 B1 | 8/2002 | Moretto |
| 6,428,708 B1 | 8/2002 | Halemba et al. |
| 6,436,282 B1 | 8/2002 | Gundrum et al. |
| D465,018 S | 10/2002 | Gustafsson et al. |
| D466,602 S | 12/2002 | Gieseke et al. |
| 6,491,811 B2 | 12/2002 | Conrad et al. |
| 6,491,815 B2 | 12/2002 | Conrad et al. |
| 6,565,749 B1 | 5/2003 | Hou et al. |
| 6,579,445 B2 | 6/2003 | Nachtman et al. |
| 6,630,016 B2 | 10/2003 | Koslow |
| 6,660,168 B2 | 12/2003 | Tremblay et al. |
| 6,827,854 B2 | 12/2004 | Mitchell et al. |
| 6,881,348 B2 | 4/2005 | Cannon et al. |
| 2001/0032823 A1 | 10/2001 | Plester et al. |
| 2002/0011434 A1 | 1/2002 | Kuennen et al. |
| 2002/0014461 A1 | 2/2002 | Kuennen et al. |
| 2002/0033365 A1 | 3/2002 | Patil |
| 2002/0043491 A1 | 4/2002 | Janik et al. |
| 2002/0060177 A1 | 5/2002 | Conrad |
| 2002/0074294 A1 | 6/2002 | Tremblay et al. |
| 2002/0134714 A1 | 9/2002 | Ozeki et al. |
| 2002/0148785 A1 | 10/2002 | Mitchell et al. |
| 2002/0150686 A1 | 10/2002 | Mitchell et al. |
| 2002/0170618 A1 | 11/2002 | Pluta et al. |
| 2002/0170921 A1 | 11/2002 | Tan et al. |
| 2002/0172637 A1 | 11/2002 | Chesneau et al. |
| 2003/0038084 A1 | 2/2003 | Mitchell et al. |
| 2003/0096703 A1 | 5/2003 | Mitchell et al. |
| 2003/0106851 A1 | 6/2003 | Tremblay et al. |
| 2003/0136728 A1 | 7/2003 | Jagtoyen et al. |
| 2003/0217963 A1 | 11/2003 | Mitchell et al. |
| 2004/0040906 A1 | 3/2004 | Jagtoyen et al. |
| 2004/0129617 A1 | 7/2004 | Tanner et al. |
| 2004/0159596 A1 | 8/2004 | Mitchell et al. |
| 2004/0164018 A1 | 8/2004 | Mitchell et al. |
| 2004/0251190 A1 | 12/2004 | Cumberland |
| 2008/0093303 A1 | 4/2008 | Tremblay et al. |
| 2009/0008323 A1 | 1/2009 | Bahm |

FOREIGN PATENT DOCUMENTS

| | | |
|---|---|---|
| DE | 2 357 585 | 11/1972 |
| DE | 3020615 | 12/1980 |
| DE | 3511389 | 5/1985 |
| DE | 3738231 | 5/1989 |
| DE | 3914940 | 11/1990 |
| DE | 4028529 | 3/1992 |
| DE | 4116128 | 11/1992 |
| DE | 93 12 279 | 10/1993 |
| DE | 19650191 | 8/1998 |
| DE | 19717579 | 10/1998 |
| DE | 10016365 | 10/2001 |
| EP | 0 285 321 A2 | 3/1988 |
| EP | 0 364 111 A1 | 4/1990 |
| EP | 0 366 539 A2 | 5/1990 |
| EP | 367389 | 5/1990 |
| EP | 0 439 005 A1 | 7/1991 |
| EP | 0 490 317 | 6/1992 |
| EP | 0 551 864 A1 | 7/1993 |
| EP | 0563027 | 6/1994 |
| EP | 0616975 A2 | 9/1994 |
| EP | 0 792 676 A1 | 9/1997 |
| EP | 0 798 003 A2 | 10/1997 |
| EP | 0880986 A2 | 12/1998 |
| EP | 0947231 A1 | 10/1999 |
| EP | 0891952 | 6/2000 |
| EP | 1106228 | 6/2001 |
| EP | 0668243 B1 | 9/2001 |
| EP | 1 419 109 | 12/2005 |
| FR | 2331 515 | 6/1977 |
| FR | 2557807 | 7/1985 |
| FR | 2743 285 | 7/1997 |
| FR | 2788511 | 7/2000 |
| GB | 191594 | 1/1923 |
| GB | 1163426 | 9/1969 |
| GB | 1202215 | 8/1970 |
| GB | 1470874 | 4/1977 |
| GB | 1546409 | 5/1979 |
| GB | 2 029 255 A | 3/1980 |
| GB | 2 051 770 A | 1/1981 |
| GB | 2238532 A | 6/1991 |
| GB | 2250281 A | 6/1992 |
| GB | 2 257 429 A | 1/1993 |
| GB | 2 311 775 A | 10/1997 |
| GB | 2311775 A | 10/1997 |
| JP | 58 131 187 A2 | 8/1983 |
| JP | 1 304 095 A | 12/1989 |
| JP | 04 247 233 A2 | 9/1992 |
| JP | 4-277080 | 10/1992 |
| JP | 05049921 | 3/1993 |
| JP | 05 253 478 A2 | 10/1993 |
| JP | 07 080 449 A2 | 3/1995 |
| JP | 08 099 080 A2 | 4/1996 |

| | | | |
|---|---|---|---|
| JP | 10 052 616 A2 | 2/1998 | |
| JP | 10076254 | 3/1998 | |
| JP | 10 139 645 A2 | 5/1998 | |
| JP | 2000281445 | 10/2000 | |
| RU | 2 034 789 | 5/1995 | |
| RU | 2 064 429 | 7/1996 | |
| RU | 2 070 438 | 12/1996 | |
| SU | 1717538 | 3/1992 | |
| WO | WO 88/07500 | 10/1988 | |
| WO | WO 91/01786 | 2/1991 | |
| WO | WO 93/12864 | 1/1992 | |
| WO | WO 92/12784 | 8/1992 | |
| WO | WO 93/17725 | 9/1993 | |
| WO | WO 93/23336 | 11/1993 | |
| WO | WO 94/10091 | 3/1994 | |
| WO | WO 94/23827 | 10/1994 | |
| WO | WO 95/05237 | 2/1995 | |
| WO | 95/06507 | 3/1995 | |
| WO | WO 95/09129 | 4/1995 | |
| WO | WO 95/24256 | 9/1995 | |
| WO | WO 96/30309 | 10/1996 | |
| WO | WO 96/30310 | 10/1996 | |
| WO | WO 97/30938 | 8/1997 | |
| WO | WO 97/34832 | 9/1997 | |
| WO | WO 97/38941 A1 | 10/1997 | |
| WO | WO 98/12489 | 3/1998 | |
| WO | WO 98/43796 | 10/1998 | |
| WO | WO 99/07456 | 2/1999 | |
| WO | WO 99/10069 | 3/1999 | |
| WO | WO 99/10076 | 3/1999 | |
| WO | WO 99/47226 | 9/1999 | |
| WO | WO 00/00266 | 1/2000 | |
| WO | WO 00/00437 | 1/2000 | |
| WO | WO 00/01624 | 1/2000 | |
| WO | WO 00/01625 | 1/2000 | |
| WO | WO 00/01626 | 1/2000 | |
| WO | WO 00/25887 | 5/2000 | |
| WO | WO 00/35559 A2 | 6/2000 | |
| WO | WO 00/37363 | 6/2000 | |
| WO | WO 00/37385 A1 | 6/2000 | |
| WO | WO 00/43319 | 7/2000 | |
| WO | WO 98/37950 | 9/2000 | |
| WO | WO 01/12559 A1 | 2/2001 | |
| WO | WO 01/44120 A2 | 6/2001 | |
| WO | WO 01/ 74725 | 10/2001 | |
| WO | WO 02/14228 A2 | 2/2002 | |
| WO | WO 02/068324 | 9/2002 | |
| WO | WO 02/083266 | 10/2002 | |
| WO | WO 02/085794 | 10/2002 | |
| WO | WO 02/098536 | 12/2002 | |
| WO | WO 02/100509 | 12/2002 | |
| WO | 03/022745 | 3/2003 | |
| WO | WO 03/068686 | 8/2003 | |
| WO | WO 2004/076361 A1 | 9/2004 | |
| WO | 2006/008324 | 1/2006 | |

OTHER PUBLICATIONS

Dimitris Ioannis Collias, Declaration under 37 CFR §1.132, Apr. 1, 2004.
Newcombe, G., et al., "Granular activated Carbon: importance of surface properties in the adsorption of naturally occurring organics", *Colloids and Surfaces A: Physiochemical and Engineering Aspects*, 1993, 65-71, vol. 78.
Gregg, S.J., et al., "Mesoporous solids: the Type IV isotherm", *Adsorption, Surface Area and Porosity*, 1982, 137-143, 2nd Edition, Academic Press, Inc.
Report of Task Force, "Guide Standard and Protocol for Testing Microbiological Water Purifiers", *United States Environmental Protection Agency*, (submitted Apr. 1986), revised Apr. 1987, 1-39.
Westvaco Products On-Line, "Wood-based Activated Carbons", (2 pgs), downloaded Jul. 2001.

Abotsi, Godried, "Interfacial Properties of Coal: A Guide to Catalyst Loading and Dispersion for Coal Conversion", *Energia*, vol. 7, No. 5, 3-5, (1996).
Moreno-Castilla, C., et al., "The Creation of Acid Carbon Surfaces by Treatment with $(NH_4)_2S_2O_8$", *Carbon*, vol. 35, No. 10-11, 1619-1626 (1997).
Franz, M., et al., "Effect of Chemical Surface Heterogeneity on the Adsorption Mechanism of Dissolved Aromatics on Activated Carbon", *Carbon*, vol. 28, No. 13, 1807-1819, (2000).
Babic, B.M., et al., "Point of Zero Charge and Intrinsic Equilibrium Constants of Activated Carbon Cloth", *Carbon*, vol. 37, No. 3, 477-481, (Feb. 22, 1999).
Menendez, J.A., et al., "On the Difference Between the Isoelectric Point and the Point of Zero Charge of Carbons", *Carbon*, vol. 33, No. 11, 1655-1657, (1995).
Barrett, Joyner, and Halenda (BJH) Process, "The Determination of Pore Volume and Area Distributions in Porous Substances I. Computations from Nitrogen Isotherns," J. Amer. Chem. Soc., vol. 73, pp. 373-380 (1951).
Bautista-Toledo, I. et al., "Activated carbons as Adsorbents of Bacteria," Conference Proceedings for Eurocarbon 98, Strasbourg, France Jul. 5-9, 1998.
Burchell, T.D., et al., "The effect of Neutron Irradiation on the Structure and Properties of Carbon-Carbon Composite Materials," Effects of Ratioation on Materials: $16^{th}$ International Symposium, ASTM STP 1175, American Society for Testing and Materials, Philadelphia, 1993.
Ceramikx:All—Carbon, Sub-Micron Performance; http://www.kxindustries.com; pp. 1-2, 2005, KX Industries, L.P.
Cuno, Process Filtration Products, Product Information, Zeta Plus VIROSORB® 1MDS, pp. 2 (1989).
Daniels, S. S., "The Adsorption of Microorganisms onto Solid Surfaces: A Review," Developments in Industrial Microbiology, pp. 211-243, Aug. 29-Sep. 4, 1971.
Derbyshire< F., et al., "Carbon Fiber Composite Molecular Sieves for Gas Separation," Eighth CIMTEC, Florence, Italy, Jun. 28-Jul. 2, 1994.
Dorfner, K., "2.1—Synthetic Resin Ion Exchangers," Ion Exchangers Properties and Applications, Cover page and pp. 16-35 (1972).
Evans, M. J. B., et al., "The Production of Chemically-Activated Carbon," Carbon, vol. 37, pp. 269-274 (1999).
Gerba, C.P., "Applied and Theoretical Aspects of Virus Adsorption to Surfaces," Advances in Applied Microbiology, vol. 30, pp. 133-168 (Copyright © 1984).
Gerba, C.P., et al., "Removal of Poliovirus and Rotavirus from Tapwater by a Quaternary Ammonium Resin," Water Res., vol. 18, No. 1, pp. 17-19 (1984).
Goyal, S. M., et al., "Concentration of Bacteriophage Lysates by Filter Chromatography," Journal of Virological Methods, vol. 1, pp. 79-85 (1980).
Goyal, S.M., "Simple Method for Concentration of Bacteria from Large Volumes of Tap Water," Applied and Environmental Microbiology, vol. 40, No. 5, pp. 912-916 (Nov. 1980).
Hercules Product Data, POLYCUP® Resins and KYMENE® 2064, Hercules Incorporated, Wilmington, DE 10 pages (date unkown).
Hercules Product Information, Hercules MSDS—Kymene 450 wet strength resin, 20 pages (Jan. 29, 1998).
Hill, Jr., W.F., et al., "Detection of Viruses in Water: Sensitivity of the Tentative Standard Method for Drinking Water," Applied and Environmental Microbiology, vol. 31, No. 2, pp. 254-261 (Feb. 1976).
Hou, K. et al., "Capture of Latex Beads, Bacteria, Endotoxin, and Viruses by Charge Modified Filters," Applied and Environmental Microbiology, vol. 40, No. 5, pp. 892-896 (Nov. 1980).
Hurst, C. J., et al., "Differential Effects of Tretrazolium Dyes upon Bacteriophage Plaque Assay Titers," Applied and Environmental Microbiologoy, vol. 60, No. 9, pp. 3462-3465 (Sep. 1994).
Isbister, J.D., et al., "Increasing ARCAT® Test Sensitivity for Examination of Potable Waters," Project Summary, United States Environmental Protection Agency, Research and Development 3 pgs. (May 1982).
Jagtoyen, M. et al., "Novel Activated Carbon Materials for Water Treatment," The European Carbon Conference "Carbon 96", Newcastle, UK Jul. 1996.

Jagtoyen, M. et al., "Activated carbons from yellow poplar and white oak by $H_3PO_4$ activation," Carbon, vol. 36, No. 7-8, pp. 1085-1097 (1998).
Jasra, R.V., et al., "Separation of Gases by Pressure Swing Adsorption," Separation Science and Technologoy, vol. 26, No. 7, pp. 885-930 (1991).
Kaneko, K., et al., "Microporosity and Adsorption Characteristics Against NO, $SO_2$ and $NH_3$ of Pitch Based Activated Carbon Fibers," Carbon, vol. 26, No. 3, pp. 327-332 (1988).
Kimber, G.M., et al., "Fabrication of Carbon Fibre Composites for Gas Separation," Gas. Sep. Purif., vol. 10, No. 2, pp. 131-136 (1996).
KXINDUSTRIES, L. P. Technical Data: CERAMIKX; http://www.kxindustries.com/matrikx/ceramiks.htm; pp. 1-3, 2002: KX Industries L.P.
LeChevallier, M.W., et al., "Disinfection of Bacteria Attached to Granular Activated Carbon," Applied and Environmental Microbiology, vol. 48, No. 5, pp. 918-923 (1984).
Ma, J., et al., "Evaluation of MK Filters for Recovery of Enteroviruses from Tap Water," Applied and Environmental Microbiology, vol. 60, No. 6, pp. 1974-1977 (Jun. 1994).
Moore, R.S., et al., "Improved Methods for Poliovirus Recovery from Water with Electropositive Adsorbent Filters," Annu. Meet. Am. Soc. Microbiol., paper Q55, 14 pages (1982).
Nupen, E.M., et al., "The Recovery of Viruses from Drinking—Water by Means of an In-Line Electropositive Cartridge Filter," National Institute for Water Research, Council for Scientific and Industrial Research, pp. 1-7 (date unknown).
Openko, N., et al., "Application of Carbon Materials in Water Purification," Conference Proceedings for Eurocarbon '98, Strasbourg, France Jul. 5-9, 1998.
Powell, T., et al., "Investigating the Effect of Carbon Shape on Virusa Adsorption," Environmental Science and Technology, vol. 34, No. 11, pp. 2779-2783 (2000).
Powell, T.M., et al., "Comparative Adsorption of a Model Bacteriophage by Activated Carbon," University of Kentucky Dept. of Civil Engineering and Center for Applied Energy Research, pp. 685-690.
Preston, D.R., et al., "Removal of Viruses from Tapwater by Fiberglass Filters Modified with a Combination of Cationic Polymers," Wat. Sci. Tech.,. vol. 21, No. 3, pp. 93-98 (1989).
Ryoo, R., et al., "Synthesis of Highly Ordered Carbon Molecular Sieves via Template—Mediated Structural Transformation," The Journal ofo Physical Chemistry B, vol. 103, Nu. 37, pp. 7743-7746 (1999).
Ryu, S.K., "Porosity of Activated Carbon Fibre," High Temperatures—High Pressures, vol. 22, pp. 345-354 (1990.
Sakoda, A., et al., "Adsorption of Viruses in Water Environment onto Solid Surfaces," Wat. Sci. Tech., vol. 35, No. 7, pp. 107-114 (1997).
Sobsey, M.D., et al., "Improved Electopositive Filters for Concentrating Viruses from Large Volumes of Water," Presents at the International Symposium on Viruses and Wastewater Treatment, pp. 107 (Sep. 15-17, 1980).
Sobsey, M.D., et al., "Concentration of Poliovirus from Tap Water Using Positively Charged Microporous Filgers," Applied and Environmental Microbiology, vol. 37, No. 3, pp. 588-595 (Mar. 1979).
Sobsey, M.D., et al., "Evaluating Adsorbent Filter Performance for Enteric Virus Concentrations in Tap Water," Research and Technology, pp. 542-548 (Oct. 1981).
United States Environmental Protection Agency, Office of Research and Development, "Stormwater Treaatment at Critical Areas: Evaluation of Filtration Methods," EPA/600/R-00/010, pp. 14, Oct. 1999.
Vaughn, J.M., et al., "Chapter 10: Virus Inactivation by Disinfectants," IV Disinfecction, pp. 217-241 (date unknown).
Wei, G.C., et al., "Carbon-Bonded Carbon Fiber Insulation for Radioisotope Space Power Systems," Ceramic Bulletin, vol. 64, No. 5, pp. 691-699 (1985).
Westvaco Products On-Line, "Wood-based Activated Carbons", (2 pgs.), downloaded Jul. 2001.
World Health Organization—Geneva, 1996 "Chapter 2—Microbiolgical Aspects: Introducction," Guidelines for drinking—water quality, Second edition, vol. 2, Health Criteria and other supporting information, cover page and pp. 9-12.
Zerda, K.S., et al., "Adsorption of Viruses to Charge—Modified Silica," Applied and Environmental Microbiolgoy, vol. 49, No. 1, pp. 91-95 (Jan. 1985).
http://www.waterfilters.net/KX-Matrikx-20-185-125-083-cermikx-SC-Water-Filter_p_12... "KX Matrikx Ceramikx SC 20-185-125-083 Water Filter", Feb. 3, 2010.

*Primary Examiner* — John Kim
(74) *Attorney, Agent, or Firm* — Cynthia L. Clay; Kim William Zerby

(57) ABSTRACT

Disclosed is a method of providing potable water that includes providing a filter, passing water through the filter, and removing bacteria and viruses from the water with the filter. The filter comprises a housing having an inlet and an outlet and a filter material disposed within the housing, the filter material formed at least in part from a plurality of filter particles consisting of mesoporous activated carbon wherein at least a portion of the plurality of filter particles is at least partially coated with silver or a silver-containing material. A sum of mesopore and macropore volumes of the filter particles may be between about 0.2 mL/g and about 2 mL/g, wherein mesopore means an intra-particle pore having a diameter between 2 nm and 50 nm, and macropore means an intra-particle pore having a diameter greater than 50 nm, a total pore volume of the filter particles is greater than about 0.4 mL/g and less than about 3 mL/g, and a ratio of the sum of the mesopore and macropore volumes to the total pore volume of the filter particles is greater than about 0.3. The filter removes bacteria and viruses from the water at a level of Filter Bacteria Log Removal of greater than about 2 logs and a Filter Viruses Log Removal of greater than about 1 log.

20 Claims, 13 Drawing Sheets

METHODS OF TREATING WATER

CROSS REFERENCE TO RELATED APPLICATIONS

Pursuant to 35 U.S.C. §120, this application is a continuation of U.S. application Ser. No. 10/705,572, filed on Nov. 11, 2003, and issued as U.S. Pat. No. 7,614,508 on Nov. 10, 2009, the substance of which is incorporated herein by reference. U.S. application Ser. No. 10/705,572 is a continuation-in-part of U.S. application Ser. No. 10/464,209, now abandoned, which was filed on Jun. 18, 2003, the substance of which is incorporated herein by reference. U.S. application Ser. No. 10/705,572 is also a continuation-in-part of U.S. application Ser. No. 10/464,210, issued as U.S. Pat. No. 7,614,506, which was filed on Jun. 18, 2003, the substance of which is incorporated herein by reference. U.S. application Ser. Nos. 10/464,209 and 10/464,210 are both continuations of International Application Nos. PCT/US03/05416 and PCT/US03/05409, both of which designate the U.S., both of which were filed Feb. 21, 2003, the substances of which are incorporated herein by reference. Additionally, U.S. application Ser. Nos. 10/464,209 and 10/464,210 are both continuations-in-part of U.S. application Ser. Nos. 09/935,962, now abandoned, and 09/935,810, now abandoned, both of which were filed on Aug. 23, 2001, the substances of which are incorporated herein by reference.

FIELD OF THE INVENTION

One or more exemplary embodiments are directed to methods of providing potable water. More particularly, one or more exemplary embodiments are directed to methods of treating untreated water with a filter to form potable water.

BACKGROUND OF THE INVENTION

Water may contain many different kinds of contaminants including, for example, particulates, harmful chemicals, and microbiological organisms, such as bacteria, parasites, protozoa and viruses. In a variety of circumstances, these contaminants should be removed before the water is used. For example, in many medical applications and in the manufacture of certain electronic components, extremely pure water should be utilized. As a more common example, any harmful contaminants should be removed from the water before it is potable, i.e., fit to consume. Despite modern water purification means, the general population may be at risk, and in particular, infants and persons with compromised immune systems may be at considerable risk.

In the U.S. and other developed countries, municipally treated water may typically include one or more of the following impurities: suspended solids, bacteria, parasites, viruses, organic matter, heavy metals, and chlorine. Breakdown and other problems with water treatment systems sometimes can lead to incomplete removal of bacteria and viruses. In other countries, there may be deadly consequences associated with exposure to contaminated water, as some of those countries may have increasing population densities, increasingly scarce water resources, and no water treatment utilities. It is sometimes common for sources of drinking water to be in close proximity to human and animal waste, such that microbiological contamination is a major health concern. As a result of waterborne microbiological contamination, an estimated six million people die each year, half of which are children under 5 years of age.

In 1987, the U.S. Environmental Protection Agency (EPA) introduced the "Guide Standard and Protocol for Testing Microbiological Water Purifiers". The protocol establishes minimum requirements regarding the performance of drinking water treatment systems that are designed to reduce specific health related contaminants in public or private water supplies. The requirements are that the effluent from a water supply source exhibits 99.99% (or equivalently, 4 log) removal of viruses and 99.9999% (or equivalently, 6 log) removal of bacteria against a challenge. Under the EPA protocol, in the case of viruses, the influent concentration should be $1 \times 10^7$ viruses per liter, and in the case of bacteria, the influent concentration should be $1 \times 10^8$ bacteria per liter. Because of the prevalence of Escherichia coli (E. coli, bacterium) in water supplies, and the risks associated with its consumption, this microorganism is used as the bacterium in the majority of studies. Similarly, the MS-2 bacteriophage (or simply, MS-2 phage) is typically used as the representative microorganism for virus removal because its size and shape (i.e., about 26 nm and icosahedral) are similar to many viruses. Thus, a filter's ability to remove MS-2 bacteriophage may demonstrate its ability to remove other viruses.

Due to these requirements and a general interest in improving the quality of potable water, there is a continuing desire to provide processes for manufacturing filter materials and filters, which are capable of removing bacteria and/or viruses from a fluid.

SUMMARY OF THE INVENTION

One embodiment of a method of providing potable water includes providing a filter, passing water through the filter, and removing bacteria and viruses from the water with the filter. The filter comprises a housing having an inlet and an outlet and a filter material disposed within the housing, the filter material formed at least in part from a plurality of filter particles consisting of mesoporous activated carbon wherein at least a portion of the plurality of filter particles is at least partially coated with silver or a sliver containing material. A sum of mesopore and macropore volumes of the filter particles may be between about 0.2 mL/g and about 2 mL/g, wherein mesopore means an intra-particle pore having a diameter between 2 nm and 50 nm, and macropore means an intra-particle pore having a diameter greater than 50 nm, a total pore volume of the filter particles is greater than about 0.4 mL/g and less than about 3 mL/g, and a ratio of the sum of the mesopore and macropore volumes to the total pore volume of the filter particles is greater than about 0.3. The filter removes bacteria and viruses from the water at a level of Filter Bacteria Log Removal of greater than about 2 logs and a Filter Viruses Log Removal of greater than about 1 log.

Another embodiment of a method of providing potable water includes providing a filter, passing water through the filter, and removing bacteria and viruses from the water with the filter. The filter comprises a housing having an inlet and an outlet and a filter material disposed within the housing, the filter material formed at least in part from a plurality of filter particles consisting of mesoporous activated carbon and other materials selected from the group consisting of activated carbon powders, activated carbon granules, activated carbon fibers, zeolites, activated alumina, activated magnesia, diatomaceous earth, activated silica, hydrotalcites, glass, polyethylene fibers, polypropylene fibers, ethylene maleic anhydride copolymers fibers, sand, clay and mixtures thereof, wherein at least a portion of the other materials are coated with silver or a silver-containing material. A sum of mesopore and macropore volumes of the filter particles may be between about 0.2 mL/g and about 2 mL/g, wherein mesopore means an intra-particle pore having a diameter between 2 nm and 50 nm, and macropore means an intra-particle pore having a diameter greater than 50 nm, a total pore volume of the filter particles is greater than about 0.4 mL/g and less than about 3 mL/g, and a ratio of the sum of the mesopore and macropore volumes to the total pore volume of the filter particles is greater than about 0.3. The filter removes bacteria and viruses from the water at a level of Filter Bacteria Log Removal of greater than about 2 logs and a Filter Viruses Log Removal of greater than about 1 log.

Another embodiment of a method of providing potable water includes providing a filter, directing water through the filter, and removing bacteria and viruses from the water with the filter. The filter comprises a housing having an inlet and an outlet and a filter material disposed within the housing, the filter material formed at least in part from a plurality of filter particles consisting of mesoporous activated carbon wherein at least a portion of the plurality of filter particles is at least partially coated with silver or a sliver containing material. A sum of mesopore and macropore volumes of the filter particles may be between about 0.2 mL/g and about 2 mL/g, wherein mesopore means an intra-particle pore having a diameter between 2 nm and 50 nm, and macropore means an intra-particle pore having a diameter greater than 50 nm, a total pore volume of the filter particles is greater than about 0.4 mL/g and less than about 3 mL/g, a ratio of the sum of the mesopore and macropore volumes to the total pore volume of the filter particles is greater than about 0.3, and the filter has a single-collector efficiency, $\eta$, of from about 0.005 to about 0.25. The filter removes bacteria and viruses from the water at a level of Filter Bacteria Log Removal of greater than about 2 logs and a Filter Viruses Log Removal of greater than about 1 log.

BRIEF DESCRIPTION OF THE DRAWINGS

While the specification concludes with claims particularly pointing out and distinctly claiming the invention, it is believed that the present invention will be better understood from the following description taken in conjunction with the accompanying drawings in which:

FIG. 2a is a mesopore volume distribution of the particles of FIG. 1a.

FIG. 3a is a point-of-zero-charge graph of the particles of FIG. 1a.

FIG. 5a illustrates the E. coli bath concentration as a function of time for the activated carbon particles of FIG. 1a.

FIG. 6a illustrates the MS-2 bath concentration as a function of time for the activated carbon particles of FIG. 1a.

DETAILED DESCRIPTION OF THE PREFERRED EMBODIMENTS

Figure 1A:
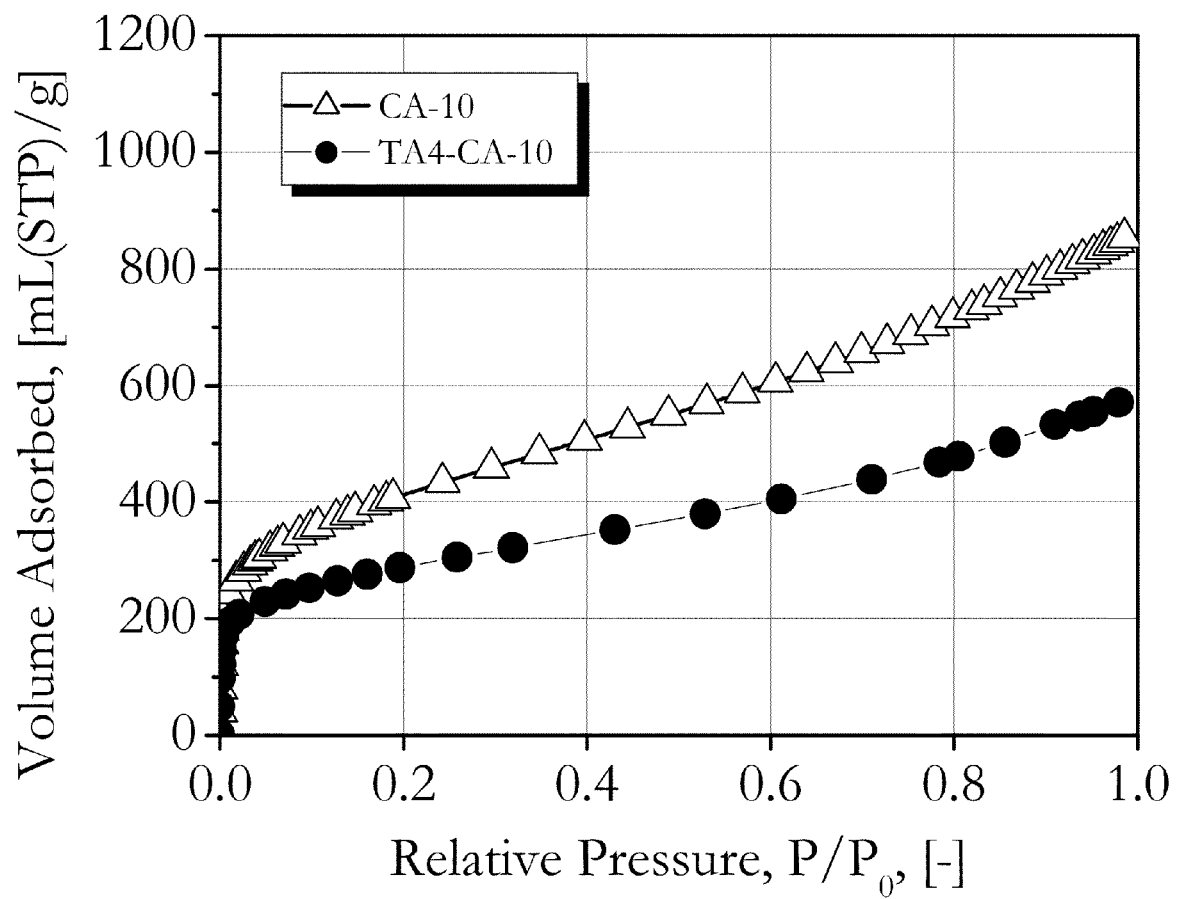
FIG. 1a is a BET nitrogen adsorption isotherm of mesoporous and acidic activated carbon particles CA-10, and mesoporous, basic, and reduced-oxygen activated carbon particles TA4-CA-10.

All documents cited are, in relevant part, incorporated herein by reference. The citation of any document is not to be construed as an admission that it is prior art with respect to the present invention.

I. Definitions

As used herein, the terms "filters" and "filtration" refer to structures and mechanisms, respectively, associated with microorganism removal (and/or other contaminant removal), via primarily adsorption and/or size exclusion to a lesser extent.

As used herein, the phrase "filter material" is intended to refer to an aggregate of filter particles. The aggregate of the filter particles forming a filter material can be either homogeneous or heterogeneous. The filter particles can be uniformly or non-uniformly distributed (e.g., layers of different filter particles) within the filter material. The filter particles forming a filter material also need not be identical in shape or size and may be provided in either a loose or interconnected form. For example, a filter material might comprise mesoporous and basic activated carbon particles in combination with activated carbon fibers, and these filter particles may be either provided in loose association or partially or wholly bonded by a polymeric binder or other means to form an integral structure.

As used herein, the phrase "filter particle" is intended to refer to an individual member or piece, which is used to form at least part of a filter material. For example, a fiber, a granule, a bead, etc. are each considered filter particles herein. Further, the filter particles can vary in size, from impalpable filter particles (e.g., a very fine powder) to palpable filter particles.

As used herein, the phrase "filter material pore volume" refers to the total volume of the inter-particle pores in the filter material with sizes larger than 0.1 µm.

As used herein, the phrase "filter material total volume" refers to the sum of the inter-particle pore volume and the volume occupied by the filter particles.

As used herein, the terms "microorganism", "microbiological organism" and "pathogen" are used interchangeably. These terms refer to various types of microorganisms that can be characterized as bacteria, viruses, parasites, protozoa, and germs.

As used herein, the phrase "Bacteria Removal Index" (BRI) of filter particles is defined as:

BRI=100×[1−(bath concentration of E. coli bacteria at equilibrium/control concentration of E. coli bacteria)], wherein "bath concentration of E. coli bacteria at equilibrium" refers to the concentration of bacteria at equilibrium in a bath that contains a mass of filter particles having a total external surface area of 1400 cm$^2$ and Sauter mean diameter less than 55 μm, as discussed more fully hereafter. Equilibrium is reached when the *E. coli* concentration, as measured at two time points 2 hours apart, remains unchanged to within half order of magnitude. The phrase "control concentration of *E. coli* bacteria" refers to the concentration of *E. coli* bacteria in the control bath, and is equal to about $3.7 \times 10^9$ CFU/L. The Sauter mean diameter is the diameter of a particle whose surface-to-volume ratio is equal to that of the entire particle distribution. Note that the term "CFU/L" denotes "colony-forming units per liter", which is a typical term used in *E. coli* counting. The BRI index is measured without application of chemical agents that provide bactericidal effects. An equivalent way to report the removal capability of filter particles is with the "Bacteria Log Removal Index" (BLRI), which is defined as:

BLRI=−log [1−(BRI/100)].

The BLRI has units of "log" (where "log" stands for logarithm). For example, filter particles that have a BRI equal to 99.99% have a BLRI equal to 4 log. A test procedure for determining BRI and BLRI values is provided hereafter.

As used herein, the phrase "Virus Removal Index" (VRI) for filter particles is defined as:

VRI=100×[1−(bath concentration of MS-2 phages at equilibrium/control concentration of MS-2 phages)], wherein "bath concentration of MS-2 phages at equilibrium" refers to the concentration of phages at equilibrium in a bath that contains a mass of filter particles having a total external surface area of 1400 cm$^2$ and Sauter mean diameter less than 55 μm, as discussed more fully hereafter. Equilibrium is reached when the MS-2 concentration, as measured at two time points 2 hours apart, remains unchanged to within half order of magnitude. The phrase "control concentration of MS-2 phages" refers to the concentration of MS-2 phages in the control bath, and is equal to about $6.7 \times 10^7$ PFU/L. Note that the term "PFU/L" denotes "plaque-forming units per liter", which is a typical term used in MS-2 counting. The VRI index is measured without application of chemical agents that provide virucidal effects. An equivalent way to report the removal capability of filter particles is with the "Viruses Log Removal Index" (VLRI), which is defined as:

VLRI=−log [1−(VRI/100)].

The VLRI has units of "log" (where "log" is the logarithm). For example, filter particles that have a VRI equal to 99.9% have a VLRI equal to 3 log. A test procedure for determining VRI and VLRI values is provided hereafter.

As used herein, the phrase "Filter Bacteria Log Removal (F-BLR)" refers to the bacteria removal capability of the filter after the flow of the first 2,000 filter material pore volumes. The F-BLR is defined and calculated as:

F-BLR=−log [(effluent concentration of *E. coli*)/(influent concentration of *E. coli*)], where the "influent concentration of *E. coli*" is set to about $1 \times 10^8$ CFU/L continuously throughout the test and the "effluent concentration of *E. coli*" is measured after about 2,000 filter material pore volumes flow through the filter. F-BLR has units of "log" (where "log" is the logarithm). Note that if the effluent concentration is below the limit of detection of the technique used to assay, then the effluent concentration for the calculation of the F-BLR is considered to be the limit of detection. Also, note that the F-BLR is measured without application of chemical agents that provide bactericidal effects.

As used herein, the phrase "Filter Viruses Log Removal (F-VLR)" refers to the virus removal capability of the filter after the flow of the first 2,000 filter material pore volumes. The F-VLR is defined and calculated as:

F-VLR=−log [(effluent concentration of MS-2)/(influent concentration of MS-2)], where the "influent concentration of MS-2" is set to about $1 \times 10^7$ PFU/L continuously throughout the test and the "effluent concentration of MS-2" is measured after about 2,000 filter material pore volumes flow through the filter. F-VLR has units of "log" (where "log" is the logarithm). Note that if the effluent concentration is below the limit of detection of the technique used to assay, then the effluent concentration for the calculation of the F-VLR is considered to be the limit of detection. Also, note that the F-VLR is measured without application of chemical agents that provide virucidal effects.

As used herein, the phrase "total external surface area" is intended to refer to the total geometric external surface area of one or more of the filter particles, as discussed more fully hereafter.

As used herein, the phrase "specific external surface area" is intended to refer to the total external surface area per unit mass of the filter particles, as discussed more fully hereafter.

As used herein, the term "micropore" is intended to refer to an intra-particle pore having a width or diameter less than 2 nm (or equivalently, 20 Å).

As used herein, the term "mesopore" is intended to refer to an intra-particle pore having a width or diameter between 2 nm and 50 nm (or equivalently, between 20 Å and 500 Å).

As used herein, the term "macropore" is intended to refer to an intra-particle pore having a width or diameter greater than 50 nm (or equivalently, 500 Å).

As used herein, the phrase "total pore volume" and its derivatives are intended to refer to the volume of all the intra-particle pores, i.e., micropores, mesopores, and macropores. The total pore volume is calculated as the volume of nitrogen adsorbed at a relative pressure of 0.9814 using the BET process (ASTM D 4820-99 standard), a process well known in the art.

As used herein, the phrase "micropore volume" and its derivatives are intended to refer to the volume of all micropores. The micropore volume is calculated from the volume of nitrogen adsorbed at a relative pressure of 0.15 using the BET process (ASTM D 4820-99 standard), a process well known in the art.

As used herein, the phrase "sum of the mesopore and macropore volumes" and its derivatives are intended to refer to the volume of all mesopores and macropores. The sum of the mesopore and macropore volumes is equal to the difference between the total pore volume and micropore volume, or equivalently, is calculated from the difference between the volumes of nitrogen adsorbed at relative pressures of 0.9814 and 0.15 using the BET process (ASTM D 4820-99 standard), a process well known in the art.

As used herein, the phrase "pore size distribution in the mesopore range" is intended to refer to the distribution of the pore size as calculated by the Barrett, Joyner, and Halenda (BJH) process, a process well known in the art.

As used herein, the term "carbonization" and its derivatives are intended to refer to a process in which the non-carbon atoms in a carbonaceous substance are reduced.

As used herein, the term "activation" and its derivatives are intended to refer to a process in which a carbonized substance is rendered more porous.

As used herein, the term "activated carbon particles" or "activated carbon filter particles" and their derivatives are intended to refer to carbon particles that have been subjected to an activation process.

As used herein, the phrase "point of zero charge" is intended to refer to the pH above which the total surface of the carbon particles is negatively charged. A well known test procedure for determining the point of zero charge is set forth hereafter.

As used herein, the term "basic" is intended to refer to filter particles with a point of zero charge greater than 7.

As used herein, the term "acidic" is intended to refer to filter particles with a point of zero charge less than 7.

As used herein, the phrase "mesoporous activated carbon filter particle" refers to an activated carbon filter particle wherein the sum of the mesopore and macropore volumes may be greater than 0.12 mL/g.

As used herein, the phrase "microporous activated carbon filter particle" refers to an activated carbon filter particle wherein the sum of the mesopore and macropore volumes may be less than 0.12 mL/g.

As used herein, the phrase "mesoporous and basic activated carbon filter particle" is intended to refer to an activated carbon filter particle wherein the sum of the mesopore and macropore volumes may be greater than 0.12 mL/g and has a point of zero charge greater than 7.

As used herein, the phrase "mesoporous, basic, and reduced-oxygen activated carbon filter particle" is intended to refer to an activated carbon filter particle wherein the sum of the mesopore and macropore volumes may be greater than 0.12 mL/g, has a point of zero charge greater than 7, and has a bulk oxygen percentage by weight of 1.5% or less.

As used herein, the phrase "mesoporous and acidic activated carbon filter particle" is intended to refer to an activated carbon filter particle wherein the sum of the mesopore and macropore volumes may be greater than 0.12 mL/g and has a point of zero charge less than 7.

As used herein, the phrase "starting material" refers to any precursor containing mesopores and macropores or capable of yielding mesopores and macropores during carbonization and/or activation.

As used herein, the phrase "axial flow" refers to flow through a planar surface and perpendicularly to that surface.

As used herein, the phrase "radial flow" typically refers to flow through essentially cylindrical or essentially conical surfaces and perpendicularly to those surfaces.

As used herein, the phrase "face area" refers to the area of the filter material initially exposed to the influent water. For example, in the case of axial flow filters, the face area is the cross sectional area of the filter material at the entrance of the fluid, and in the case of the radial flow filter, the face area is the outside area of the filter material.

As used herein, the phrase "filter depth" refers to the linear distance that the influent water travels from the entrance to the exit of the filter material. For example, in the case of axial flow filters, the filter depth is the thickness of the filter material, and in the case of the radial flow filter, the filter depth is half of the difference between the outside and inside diameters of the filter material.

As used herein, the phrases "average fluid residence time" and/or "average fluid contact time" refer to the average time that the fluid is in contact with the filter particles inside the filter as it travels through the filter material, and are calculated as the ratio of the filter material pore volume to the fluid flow rate.

As used herein, the phrases "filter porosity" and/or "filter bed porosity" refer to the ratio of the filter material pore volume to the filter material total volume.

As used herein, the phrase "inlet" refers to the means in which a fluid is able to enter the filter or filter material. For example, the inlet can be a structure that is part of the filter, or the filter material face area.

As used herein, an "outlet" refers to the means in which a fluid is able to exit the filter or filter material. For example, the outlet can be a structure that is part of the filter, or the cross sectional area of the filter material at the exit of the fluid.

II. Mesoporous Activated Carbon Filter Particles

Unexpectedly it has been found that mesoporous activated carbon filter particles adsorb a larger number of microorganisms compared to microporous activated carbon filter particles. Also, unexpectedly it has been found that mesoporous and basic activated carbon filter particles adsorb a larger number of microorganisms compared to that adsorbed by mesoporous and acidic activated carbon filter particles. Furthermore, it has been found unexpectedly that mesoporous, basic, and reduced-oxygen activated carbon filter particles adsorb a larger number of microorganisms compared to that adsorbed by mesoporous and basic activated carbon filter particles without reduced bulk oxygen percentage by weight.

Although not wishing to be bound by any theory, applicants hypothesize that, with regard to porosity, a large number of mesopores and/or macropores provide more convenient adsorption sites (openings or entrances of the mesopores/macropores) for the pathogens, their fimbriae, and surface polymers (e.g. proteins, lipopolysaccharides, oligosaccharides and polysaccharides) that constitute the outer membranes, capsids and envelopes of the pathogens because the typical size of such is similar to that of the entrances of the mesopores and macropores. Also, mesoporosity and macroporosity may correlate with one or more surface properties of the carbon, such as surface roughness.

Also, not wishing to be bound by theory, applicants hypothesize that basic activated carbon surfaces may contain the types of functionality that are necessary to attract a larger number of microorganisms compared to those attracted by an acidic carbon surface. This enhanced adsorption onto the basic carbon surfaces might be attributed to the fact that the basic carbon surfaces attract the typically negatively-charged microorganisms and functional groups on their surface. Applicants further hypothesize that basic carbon is capable of producing disinfectants when placed in water by reducing molecular oxygen. Although the final product of the reduction is hydroxide, applicants believe that reactive oxygen intermediates, such as superoxide, hydroperoxide, and/or hydroxy radicals, are formed and maybe sufficiently long-lived to diffuse from carbon into bulk solution.

Furthermore, applicants believe that carbon may become more basic as the bulk oxygen percentage by weight is reduced. A low bulk oxygen percentage by weight may lead to improved bacteria/viruses adsorption because there will be: (1) less carboxylic acids and hence a less negative surface to repel bacteria/viruses; and (2) a less hydrated surface so that water is more easily displaced by bacteria/viruses as they attempt to adsorb to the surface (i.e., less of an energy penalty for the bacteria/virus to displace other species already occupying sites on the surface). This latter reason (i.e., a less hydrated surface) also ties in with the idea that in some embodiments, the surface, discussed hereafter, may be somewhat hydrophobic (that is, it may have just enough oxygen substitution on the edge carbon atoms to allow it to wet out, but not so much as to make it excessively hydrophilic).

The filter particles can be provided in a variety of shapes and sizes. For example, the filter particles can be provided in simple forms such as powder, granules, fibers, and beads. The filter particles can be provided in the shape of a sphere, polyhedron, cylinder, as well as other symmetrical, asymmetrical, and irregular shapes. Further, the filter particles can also be formed into complex forms such as webs, screens, meshes, non-wovens, wovens, and bonded blocks, which may or may not be formed from the simple forms described above. Like shape, the size of the filter particle can also vary, and the size need not be uniform among filter particles used in any single filter. In fact, it can be desirable to provide filter particles having different sizes in a single filter. Generally, the size of the filter particles may be between about 0.1 μm and about 10 mm, in some embodiments between about 0.2 μm and about 5 mm, in some embodiments between about 0.4 μm and about 1 mm, and in some embodiments between about 1 μm and about 500 μm. For spherical and cylindrical particles (e.g., fibers, beads, etc.), the above-described dimensions refer to the diameter of the filter particles. For filter particles having substantially different shapes, the above-described dimensions refer to the largest dimension (e.g. length, width, or height).

The filter particles may be the product of any precursor that contains mesopores and macropores or generates mesopores and macropores during carbonization and/or activation. For example, and not by way of limitation, the filter particles can be wood-based activated carbon particles, coal-based activated carbon particles, peat-based activated carbon particles, pitch-based activated carbon particles, tar-based activated carbon particles, bean-based activated carbon particles, other lignocellulosic-based activated carbon particles, and mixtures thereof.

Activated carbon can display acidic, neutral, or basic properties. The acidic properties may be associated with oxygen-containing functionalities or functional groups, such as, and not by way of limitation, phenols, carboxyls, lactones, hydroquinones, anhydrides, and ketones. The basic properties may be associated with functionalities such as pyrones, chromenes, ethers, carbonyls, as well as the basal plane $\pi$ electrons. The acidity or basicity of the activated carbon particles is determined with the "point of zero charge" technique (Newcombe, G., et al., *Colloids and Surfaces A: Physicochemical and Engineering Aspects,* 78, 65-71 (1993)), the substance of which is incorporated herein by reference. The technique is further described in section VII hereafter. Examples of filter particles may have a point of zero charge between 1 and 14, in some embodiments greater than about 4, in other embodiments greater than about 6, in other embodiments greater than about 7, in other embodiments greater than about 8, in other embodiments greater than about 9, and in yet other embodiments between about 9 and about 12.

The point of zero charge of activated carbons inversely correlates with their bulk oxygen percentage by weight. Examples of filter particles may have a bulk oxygen percentage by weight less than about 5%, in some embodiments less than about 2.5%, in some embodiments less than about 2.3%, in some embodiments less than about 2%, in some embodiments less than about 1.2%, and in some embodiments less than about 1%, and/or greater than about 0.1%, in some embodiments greater than about 0.2%, in some embodiments greater than about 0.25%, and in some embodiments greater than about 0.3%. Also, the point of zero charge of activated carbon particles correlates with the ORP of the water containing the particles because the point of zero charge is a measure of the ability of the carbon to reduce oxygen (at least for basic carbons). Examples of filter particles may have an ORP less than about 570 mV, in some embodiments less than about 465 mV, in some embodiments less than about 400, in some embodiments less than about 360 mV, in some embodiments less than about 325 mV, and in some embodiments between about 290 mV and about 175 mV.

The electric resistance of the activated carbon filter particles or filter material relates to their ability to form a filter block. For example, a resistive heating method can be used to form filter blocks, wherein a filter material is heated by passing electricity between 2 ends of the filter material. The electric resistance of the filter material will control its ability to heat in a short time. The electric resistance is measured by forming filter blocks using conditions as those mentioned in Examples 3 and 4, and measuring the electric resistance between the 2 faces of the block by contacting them with 2 electrodes from a voltmeter. Exemplary electric resistances of the filters of Examples 3 and 4 are about 350Ω and about 40Ω, respectively. Also, the respective electric resistances of filters made with CARBOCHEM CA-10 of Example 1, and TA4-CA10 of Example 2, are about 1.3 MΩ, and about 100Ω.

Filter particles may be achieved by way of treating a starting material as described herein. The treatment conditions may include atmosphere composition, pressure, temperature, and/or time. The atmospheres of the present invention may be reducing or inert. Heating the filter particles in the presence of reducing atmospheres, steam, or inert atmospheres yields filter material with reduced surface oxygen functionality. Examples of suitable reducing atmospheres may include hydrogen, nitrogen, dissociated ammonia, carbon monoxide, and/or mixtures. Examples of suitable inert atmospheres may include argon, helium, and/or mixtures thereof.

The treatment temperature, when the activated carbon particles do not contain any noble metal catalysts (e.g., platinum, gold, palladium) may be between about 600° C. and about 1,200° C., in some embodiments between about 700° C. and about 1,100° C., in some embodiments between about 800° C. and about 1,050° C., and in some embodiments between about 900° C. and about 1,000° C. If the activated carbon particles contain noble metal catalysts, the treatment temperature may be between about 100° C. and about 800° C., in some embodiments between about 200° C. and about 700° C., in some embodiments between about 300° C. and about 600° C., and in some embodiments between about 350° C. and about 550° C.

The treatment time may be between about 2 minutes and about 10 hours, in some embodiments between about 5 minutes and about 8 hours, in some embodiments between about 10 minutes and about 7 hours, and in some embodiments between about 20 minutes and about 6 hours. The gas flow rate may be between about 0.25 standard L/h·g (i.e., standard liters per hour and gram of carbon; 0.009 standard ft$^3$/h·g) and about 60 standard L/h·g (2.1 standard ft$^3$/h·g), in some embodiments between about 0.5 standard L/h·g (0.018 standard ft$^3$/h·g) and about 30 standard L/h·g (1.06 standard ft$^3$/h·g), in some embodiments between about 1.0 standard L/h·g (0.035 standard ft$^3$/h·g) and about 20 standard L/h·g (0.7 standard ft$^3$/h·g), and in some embodiments between about 5 standard L/h·g (0.18 standard ft$^3$/h·g) and about 10 standard L/h·g (0.35 standard ft$^3$/h·g). The pressure can be maintained greater than, equal to, or less than atmospheric during the treatment time. As will be appreciated, other processes for producing a mesoporous, basic, and reduced-oxygen activated carbon filter material can be employed. Also, such treatment of a starting material as described above may be repeated multiple times, depending on the starting material, in order to obtain a filter material.

A starting material may be commercially obtained, or may be made by the methods which are well known in the art, as described in, for example, Jagtoyen, M., and F. Derbyshire, *Carbon*, 36(7-8), 1085-1097 (1998), and Evans, et al., *Carbon*, 37, 269-274 (1999), and Ryoo et al., *J. Phys. Chem. B*, 103(37), 7743-7746 (1999), the substances of which are herein incorporated by reference. Typical chemicals used for activation/carbonization include phosphoric acid, zinc chloride, ammonium phosphate, etc., which may be used in combination with the methods described in the two immediately cited journals.

Figure 1B:
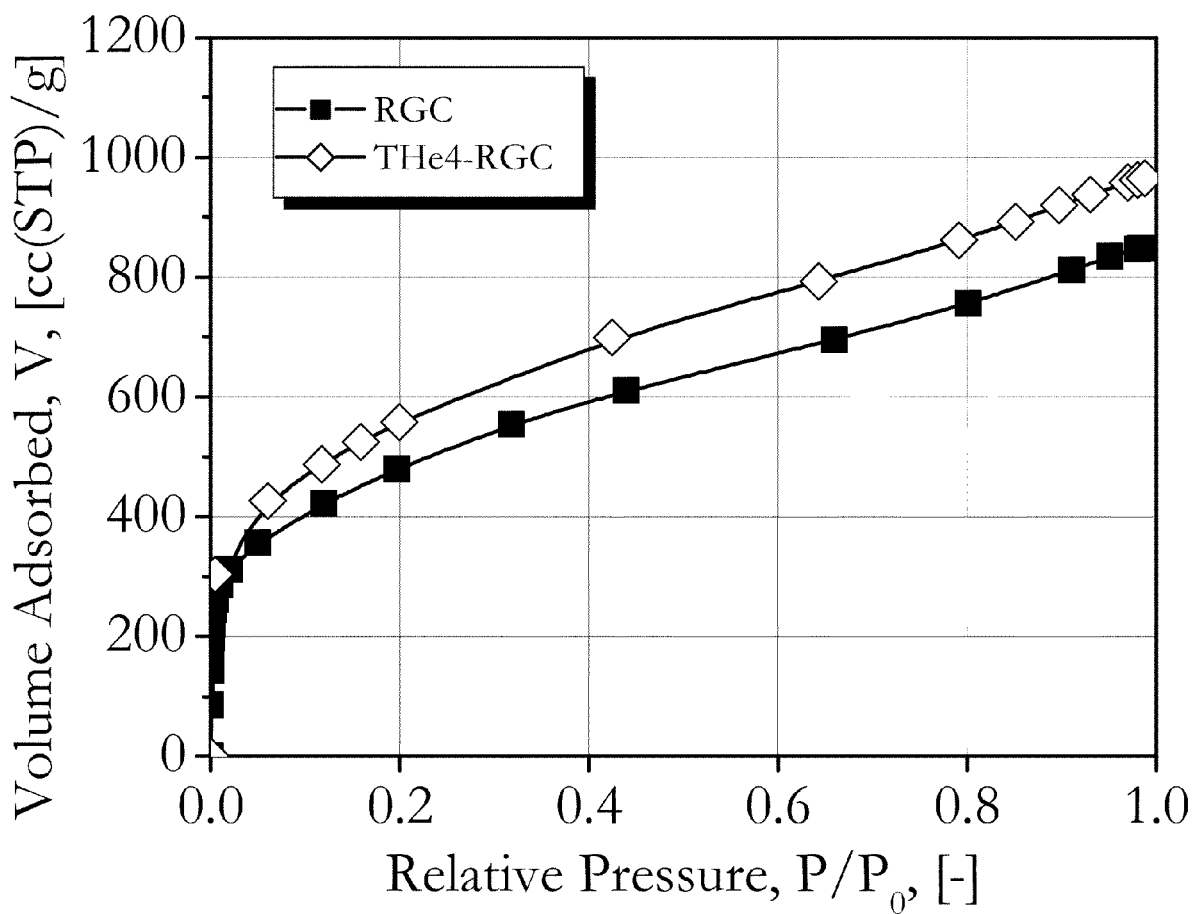
FIG. 1b is a BET nitrogen adsorption isotherm of mesoporous and basic activated carbon particles RGC, and mesoporous, basic, and reduced-oxygen activated carbon THe-4-RGC.

The Brunauer, Emmett and Teller (BET) specific surface area and the Barrett, Joyner, and Halenda (BJH) pore size distribution can be used to characterize the pore structure of particles. In some embodiments, the BET specific surface area of the filter particles may be between about 500 $m^2/g$ and about 3,000 $m^2/g$, in some embodiments between about 600 $m^2/g$ to about 2,800 $m^2/g$, in some embodiments between about 800 $m^2/g$ and about 2,500 $m^2/g$, and in some embodiments between about 1,000 $m^2/g$ and about 2,000 $m^2/g$. Referring to FIG. 1a, examples of nitrogen adsorption isotherms, using the BET process, of a mesoporous, basic, and reduced-oxygen wood-based activated carbon (TA4-CA-10), and a mesoporous and acidic wood-based activated carbon (CA-10) are illustrated. Referring to FIG. 1b, examples of nitrogen adsorption isotherms, using the BET process, of a mesoporous and basic wood-based activated carbon (RGC), and a mesoporous, basic, and reduced-oxygen wood-based activated carbon (THe-4-RGC) are illustrated.

The total pore volume of the mesoporous and basic activated carbon particles is measured during the BET nitrogen adsorption and is calculated as the volume of nitrogen adsorbed at a relative pressure, $P/P_0$, of 0.9814. More specifically and as is well known in the art, the total pore volume is calculated by multiplying the "volume of nitrogen adsorbed in mL(STP)/g" at a relative pressure of 0.9814 with the conversion factor 0.00156, that converts the volume of nitrogen at STP (standard temperature and pressure) to liquid. The total pore volume of embodiments of the filter particles may be greater than about 0.4 mL/g, or greater than about 0.7 mL/g, or greater than about 1.3 mL/g, or greater than about 2 mL/g, and/or less than about 3 mL/g, or less than about 2.6 mL/g, or less than about 2 mL/g, or less than about 1.5 mL/g.

The sum of the mesopore and macropore volumes is measured during the BET nitrogen adsorption and calculated as the difference between the total pore volume and the volume of nitrogen adsorbed at $P/P_0$ of 0.15. The sum of the mesopore and macropore volumes of embodiments of the filter particles may be greater than about 0.12 mL/g, or greater than about 0.2 mL/g, or greater than about 0.4 mL/g, or greater than about 0.6 mL/g, or greater than about 0.75 mL/g, and/or less than about 2.2 mL/g, or less than about 2 mL/g, or less than about 1.5 mL/g, or less than about 1.2 mL/g, or less than about 1 mL/g.

Figure 2A:
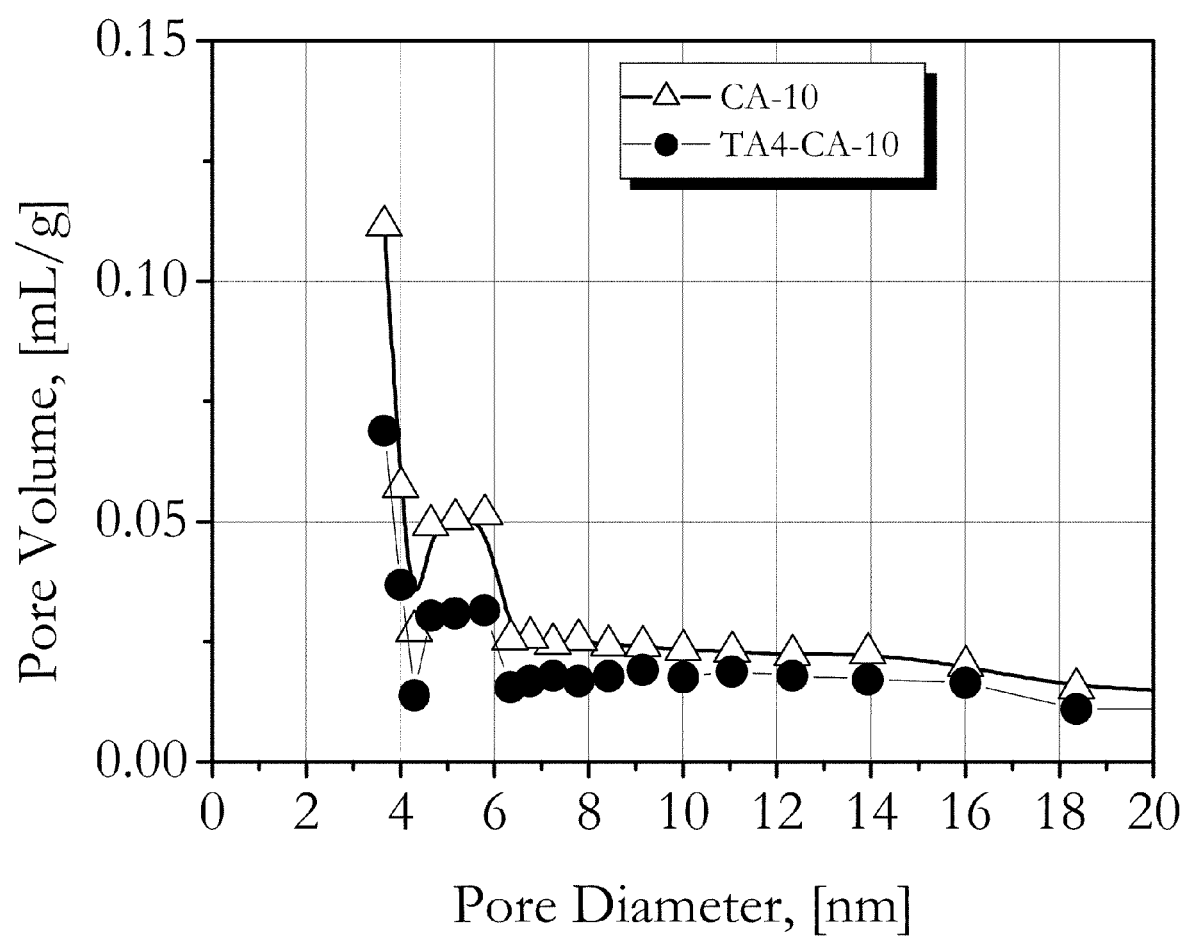
Figure 2B:
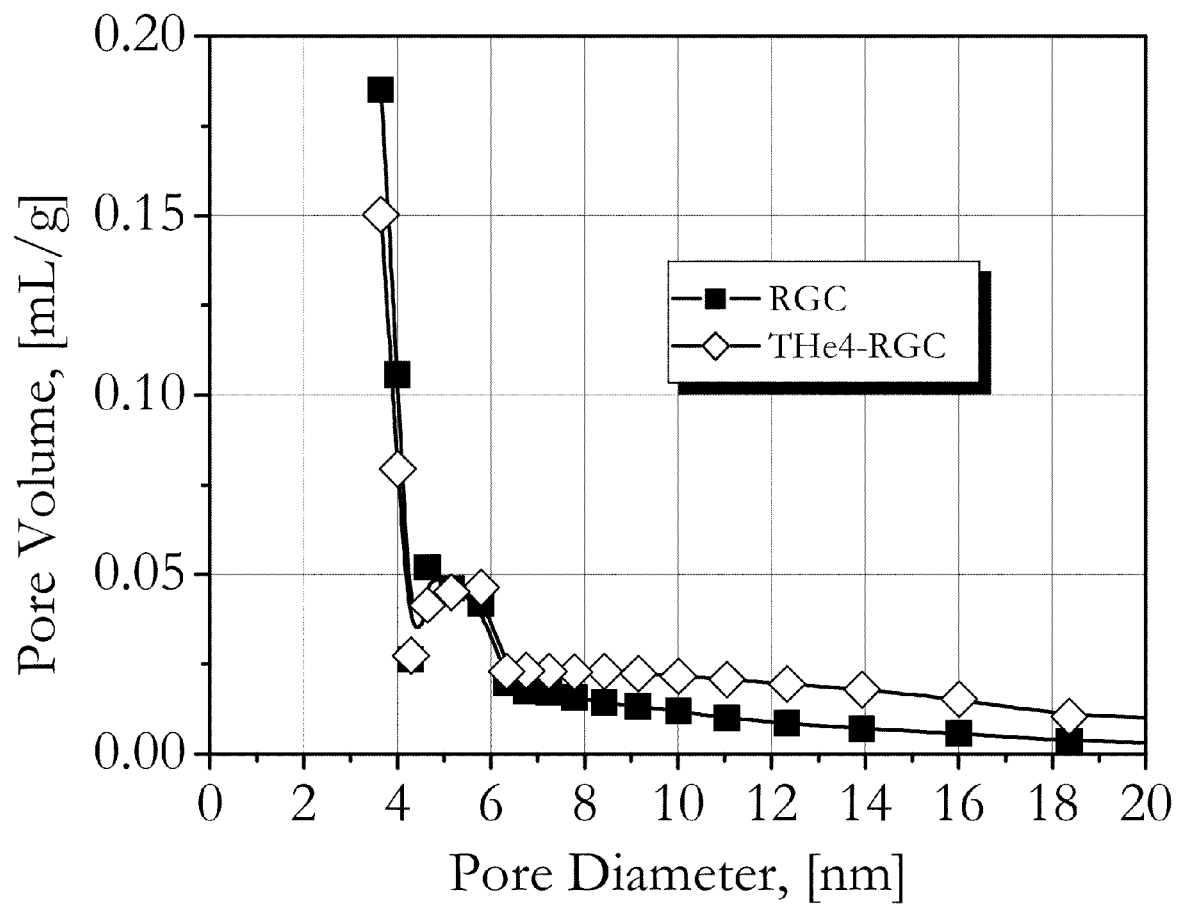
FIG. 2b is a mesopore volume distribution of the particles of FIG. 1b.

The BJH pore size distribution can be measured using the Barrett, Joyner, and Halenda (BJH) process, which is described in *J. Amer. Chem. Soc.*, 73, 373-80 (1951) and Gregg and Sing, ADSORPTION, SURFACE AREA, AND POROSITY, 2nd edition, Academic Press, New York (1982), the substances of which are incorporated herein by reference. In one embodiment, the pore volume may be at least about 0.01 mL/g for any pore diameter between about 4 nm and about 6 nm. In another embodiment, the pore volume may be between about 0.01 mL/g and about 0.04 mL/g for any pore diameter between about 4 nm and about 6 nm. In yet another embodiment, the pore volume may be at least about 0.03 mL/g for pore diameters between about 4 nm and about 6 nm or is between about 0.03 mL/g and about 0.06 mL/g. In yet another embodiment, the pore volume may be between about 0.015 mL/g and about 0.06 mL/g for pore diameters between about 4 nm and about 6 nm. FIG. 2a illustrates examples of mesopore volume distributions, as calculated by the BJH process, of a mesoporous, basic, and reduced-oxygen activated carbon (TA4-CA-10), and a mesoporous and acidic wood-based activated carbon (CA-10). FIG. 2b illustrates examples of mesopore volume distributions, as calculated by the BJH process, of a mesoporous and basic wood-based activated carbon (RGC), and a mesoporous, basic, and reduced-oxygen wood-based activated carbon (THe-4-RGC).

The ratio of the sum of the mesopore and macropore volumes to the total pore volume may be greater than about 0.3, in some embodiments greater than about 0.4, in some embodiments greater than about 0.6, and in some embodiments between about 0.7 and about 1.

The total external surface area is calculated by multiplying the specific external surface area by the mass of the filter particles, and is based on the dimensions of the filter particles. For example, the specific external surface area of mono-dispersed (i.e., with uniform diameter) fibers is calculated as the ratio of the area of the fibers (neglecting the 2 cross sectional areas at the ends of the fibers) to the weight of the fibers. Thus, the specific external surface area of the fibers is equal to: $4/D\rho$, where D is the fiber diameter and $\rho$ is the fiber density. For monodispersed spherical particles, similar calculations yield the specific external surface area as equal to: $6/D\rho$, where D is the particle diameter and $\rho$ is the particle density. For poly-dispersed fibers, spherical or irregular particles, the specific external surface area is calculated using the same respective formulae as above after substituting $\overline{D}_{3,2}$ for D, where $\overline{D}_{3,2}$ is the Sauter mean diameter, which is the diameter of a particle whose surface-to-volume ratio is equal to that of the entire particle distribution. A process, well known in the art, to measure the Sauter mean diameter is by laser diffraction, for example using the Malvern equipment (Malvern Instruments Ltd., Malvern, U.K.). The specific external surface area of the filter particles may be between about 10 $cm^2/g$ and about 100,000 $cm^2/g$, in some embodiments between about 50 $cm^2/g$ and about 50,000 $cm^2/g$, in some embodiments between about 100 $cm^2/g$ and about 10,000 $cm^2/g$, and in some embodiments between about 500 $cm^2/g$ and about 7,000 $cm^2/g$.

The BRI of the mesoporous, or mesoporous and basic, or mesoporous, basic and reduced-oxygen activated carbon particles, when measured according to the test procedure set forth herein, may be greater than about 99%, in some embodiments greater than about 99.9%, in some embodiments greater than about 99.99%, and in some embodiments greater than about 99.999%. Equivalently, the BLRI of the mesoporous, or mesoporous and basic, or mesoporous, basic and reduced-oxygen activated carbon particles may be greater than about 2 log, in some embodiments greater than about 3 log, in some embodiments greater than about 4 log, and in some embodiments greater than about 5 log. The VRI of the mesoporous, or mesoporous and basic, or mesoporous, basic and reduced-oxygen activated carbon particles, when measured according to the test procedure set forth herein, may be greater than about 90%, in some embodiments greater than about 95%, in some embodiments greater than about 99%, and in some embodiments greater than about 99.9%. Equivalently, the VLRI of the mesoporous, or mesoporous and basic, or mesoporous, basic and reduced-oxygen activated carbon particles may be greater than about 1 log, in some embodiments greater than about 1.3 log, in some embodiments greater than about 2 log, and in some embodiments greater than about 3 log.

The steady state, one-dimensional, "clean" bed filtration theory (assuming negligible dispersive transport and desorption of microorganisms) for an axial flow filter (Yao et al., *Environ. Sci. Technol.* 5, 1102-1112 (1971)), the substance of which is incorporated herein by reference, describes that:

$$C/C_0 = \exp(-\lambda L), \quad (1)$$

where C is the effluent concentration, $C_0$ is the influent concentration, $\lambda$ is the filter coefficient with units of reciprocal length, and L is the depth of the filter. Note that based on the definitions above, the number of collisions that a non-attaching microorganism will experience as it travels over a distance L through the filter will be $(\lambda/\alpha)L$, where $\alpha$ is the "clean" bed sticking coefficient (also called, collision efficiency), defined as the ratio of the number of microorganisms that stick to the collector surface to the number of microorganisms that strike the collector surface. Equation 1 is also valid for radial flow filters if L is substituted by $R_0-R_i$, where $R_0$ is the outside radius and $R_i$ is the inside radius, and the filter coefficient is averaged over the thickness of the filter. The filter coefficient for a particle-containing bed (not fibers) is as follows:

$$\lambda = (3(1-\epsilon)\eta\alpha)/2d_c, \quad (2)$$

where $\epsilon$ is the filter bed porosity, $\eta$ is the single-collector efficiency, defined as the ratio of the number of microorganisms that strike the collector surface to the number of microorganisms that flow towards the collector surface, and $d_c$ is the collector particle diameter. The factor (3/2) in the formula above is valid for spherical or spherical-like particles. For cylindrical particles (e.g. fibers) the term becomes $(4/\pi)$, and $d_c$ is then the diameter of the cylinder. Also, note that the term "clean" bed means that the collector surfaces have not yet accumulated enough microorganisms to cause a reduction in the deposition efficiency of the new microorganisms (i.e., blocking).

Based on the above "clean" bed filtration model, the F-BLR and F-VLR can be calculated as follows:

$$\text{F-BLR or F-VLR} = -\log(C/C_0) = (\lambda L/2.3). \quad (3)$$

The single-collector efficiency, $\eta$, is calculated using the Rajagopalan and Tien model (RT model; *AIChE J.*, 22(3), 523-533 (1976), and *AIChE J.*, 28, 871-872 (1982)) as follows:

$$\eta = 4A_S^{1/3}Pe^{-2/3} + A_S Lo^{1/8}R^{15/8} + 0.00338 A_S G^{6/5} R^{2/5}, \quad (4)$$

where $$A_s = \frac{2(1-\gamma^5)}{2 - 3\gamma + 3\gamma^5 - 2\gamma^6},$$

$\gamma = (1-\epsilon)^{1/3}$, Pe is the dimensionless Peclet number $$Pe = \frac{3\mu\pi U d_c d_m}{kT},$$

Lo is the dimensionless London—van der Waals number $$Lo = \frac{4H}{9\pi\mu d_m^2 U},$$

R is the dimensionless interception number $$R = \frac{d_m}{d_c},$$

G is the dimensionless sedimentation number $$G = \frac{g(\rho_m - \rho_f)d_m^2}{18\mu U},$$

$\mu$ is the dynamic fluid viscosity (equal to 1 mPa·s for water), U is the superficial fluid velocity (calculated as: $U=4Q/\pi D^2$, for axial flow filters, where Q is the fluid flowrate, and D is the diameter of the face area of the filter; and $U(R)=Q/2\pi RX$ for radial flow filters, where X is the length of the filter, and R is the radial position between $R_i$ and $R_0$), $d_m$ is the microorganism diameter (or diameter of an equivalent sphere, if the microorganism is non spherical), k is the Boltzmann's constant (equal to $1.38 \times 10^{-23}$ kg·m$^2$/s$^2$·K), T is the fluid temperature, H is the Hamaker constant (it is typically equal to 10-20 J), g is the gravitational constant (equal to 9.81 m/s$^2$), $\rho_m$ is the density of the microorganisms, and $\rho_f$ is the fluid density (equal to 1 g/mL for water). For the purposes and the materials of the present invention, H is equal to $10^{-20}$ J, T is equal to 298 K, $\rho_m$ is equal to 1.05 g/mL, $\mu$ is equal to 1 mPa·s. Also, for the purposes of the present invention, $d_c$ is the volume median diameter $D_{V,0.5}$, which is the particle diameter such that 50% of the total particle volume is in particles of smaller diameter. Also, the average fluid residence time is calculated as:

$$\tau = \frac{\epsilon\pi D^2 L}{4Q}, \text{ for axial flow filters, and} \quad (5)$$

$$\tau = \frac{\epsilon\pi(R_0^2 - R_i^2)X}{Q}, \text{ for radial flow filters.}$$

The sticking coefficient, $\alpha$, is typically calculated experimentally, for example using the "microbe and radiolabel kinesis" (MARK) technique described in Gross et al. (*Water Res.*, 29(4), 1151-1158 (1995)). The single-collector efficiency, $\eta$, of examples of the filters described herein may be greater than about 0.002, in some embodiments greater than about 0.02, in some embodiments greater than about 0.2, in some embodiments greater than about 0.4, in some embodiments greater than about 0.6, and in some embodiments between about 0.8 and about 1. The filter coefficient, $\lambda$, of examples of the filters described herein may be greater than about 10 m$^{-1}$, in some embodiments greater than about 20 m$^{-1}$, in some embodiments greater than about 30 m$^{-1}$, in some embodiments greater than about 40 m$^{-1}$, and/or less than about 20,000 m$^{-1}$, in some embodiments less than about 10,000 m$^{-1}$, in some embodiments less than about 5,000 m$^{-1}$, and in some embodiments less than about 1,000 m$^{-1}$.

The F-BLR of filters containing mesoporous, or mesoporous and basic, or mesoporous, basic, and reduced-oxygen activated carbon particles, when measured according to the test procedure set forth herein, may be greater than about 2 logs, in some embodiments greater than about 3 logs, in some embodiments greater than about 4 logs, and in some embodiments greater than about 6 logs. The F-VLR of filters containing mesoporous, or mesoporous and basic, or mesoporous, basic, and reduced-oxygen activated carbon particles, when measured according to the test procedure set forth herein, may be greater than about 1 log, in some embodiments greater than about 2 logs, in some embodiments greater than about 3 logs, and in some embodiments greater than about 4 logs.

In one embodiment of the present invention, the filter particles comprise mesoporous activated carbon particles that are wood-based activated carbon particles. These particles have a BET specific surface area between about 1,000 $m^2/g$ and about 2,000 $m^2/g$, total pore volume between about 0.8 mL/g and about 2 mL/g, and sum of the mesopore and macropore volumes between about 0.4 mL/g and about 1.5 mL/g.

In another embodiment of the present invention, the filter particles comprise mesoporous and basic activated carbon particles that are wood-based activated carbon particles. These particles have a BET specific surface area between about 1,000 $m^2/g$ and about 2,000 $m^2/g$, total pore volume between about 0.8 mL/g and about 2 mL/g, and sum of the mesopore and macropore volumes between about 0.4 mL/g and about 1.5 mL/g.

In yet another embodiment of the present invention, the filter particles comprise mesoporous, basic, and reduced-oxygen activated carbon particles that were initially acidic and rendered basic and reduced-oxygen with treatment in a dissociated ammonia atmosphere. These particles are wood-based activated carbon particles. The treatment temperature is between about 925° C. and about 1,000° C., the ammonia flow rate is between about 1 standard L/h·g and about 20 standard L/h·g, and the treatment time is between about 10 minutes and about 7 hours. These particles have a BET specific surface area between about 800 $m^2/g$ and about 2,500 $m^2/g$, total pore volume between about 0.7 mL/g and about 2.5 mL/g, and sum of the mesopore and macropore volumes between about 0.21 mL/g and about 1.7 mL/g. A non-limiting example of an acidic activated carbon that is converted to a basic and reduced-oxygen activated carbon is set forth below.

In even yet another embodiment of the present invention, the filter particles comprise mesoporous, basic, and reduced-oxygen activated carbon particles, that were initially mesoporous and basic, with treatment in an inert (i.e., helium) atmosphere. These particles are wood-based activated carbon particles. The treatment temperature is between about 800° C. and about 1,000° C., the helium flowrate is between about 1 standard L/h·g and about 20 standard L/h·g, and the treatment time is between about 10 minutes and about 7 hours. These particles have a BET specific surface area between about 800 $m^2/g$ and about 2,500 $m^2/g$, total pore volume between about 0.7 mL/g and about 2.5 mL/g, and sum of the mesopore and macropore volumes between about 0.21 mL/g and about 1.7 mL/g. A non-limiting example of a basic activated carbon that is converted to a basic and reduced-oxygen activated carbon is set forth below.

III. Silver and Silver Containing Materials

The presence of metals in active carbon may greatly enhance the efficiency and selectivity of the active carbon when it is employed in filtering applications. Specifically, the presence of silver can improve the microbial removal of carbon based water filters. And more specifically, the Bacterial Removal Index (BRI) and the Viral Removal Index (VRI) can both be increased with the incorporation of silver.

Thus, in one aspect, embodiments of the filter described herein may be utilized for providing potable water. The filter may comprise a housing having an inlet and an outlet, and a filter material disposed within the housing formed at least in part from a plurality of mesoporous activated carbon filter particles and particles selected from the group consisting of mesoporous activated carbon filter particles coated entirely with silver or a silver containing material, mesoporous activated carbon filter particles partially coated with silver or a silver containing material, silver particles and mixtures thereof. There is further provided a kit comprising the filter described directly above, and a package for containing the filter. Further, either the package or the filter housing may comprise information that the filter or filter material provides: bacterial removal; virus removal; microbial removal; killing of bacteria, killing of viruses, killing of microbials, or any combination of these.

More specifically, embodiments of the filter material can comprise, among other things, an ad-mixture of silver and mesoporous activated carbon filter particles, mesoporous activated carbon filter particles coated partially or entirely with silver and/or a silver containing material; mesoporous activated carbon filter particles coated partially or entirely with silver or a silver containing material; or an ad-mixture of mesoporous activated carbon filter particles, mesoporous activated carbon filter particles coated partially or entirely with silver and/or a silver containing material. The weight ratio of the silver or silver-containing material to mesoporous activated carbon filter particles may be from about 1:10,000 to about 1:1, based on the weight of the silver or silver-containing material, respectively, and may have a BET surface area of at least 800 square meters per gram and a bulk density of at least 0.1 gram per cubic centimeter.

In the production of the filter material, any methods known in the art for adding silver to a carbon based matrix may be utilized. See, for example, U.S. Pat. Nos. 4,482,641 and 4,045,553, issued to Wennerberg, on Nov. 13, 1984, and Mitsumori et al., on Aug. 30, 1977, respectively. See also, Dimitry, U.S. Pat. No. 3,886,093, which discloses activated carbons having uniformly distributed active metal sites and a method for making such activated carbons. The method of Dimitry involves mixing an aqueous solution of a lignin salt with an aqueous solution of a transition metal salt to precipitate the transition metal and lignin as a metal lignate. According to Dimitry, the transition metal must be capable of forming a chemical bond with the lignin and in so doing precipitating the lignin from solution as a metal lignate. Dimitry discloses that the time required to complete the precipitation is less than one hour and that usually 30 minutes is sufficient for this purpose. According to Dimitry, the wet metal lignate precipitate can then be dried in a spray drier. The precipitate is then carbonized at a temperature between 371° C. and 983° C. and finally activated at a temperature between 760° C. and 1065° C. Dimitry states that, although drying the metal lignate precipitate is not critical to form an activated carbon product, drying is necessary to form a high surface area end product. The Dimitry, Mitsumori et al. and Wennerberg patents are incorporated herein in their entirety by reference.

One non-limiting method of producing a substantially uniform dispersion of a silver or silver-containing material on a porous carbon matrix comprises: forming a uniform co-crystallite of a precursor of the silver or silver-containing material and of a carbon precursor as defined above; forming a uniform powdered mixture of the co-crystallite and organic solids comprising an alkali metal hydroxide; pyrolyzing the powdered mixture in an inert atmosphere at a temperature in the range of from about 400° C. to about 980° C. to form the carbon matrix having the silver or silver-containing material substantially uniformly dispersed therein; and separating unreacted inorganic material and inorganic reaction products other than the dispersed silver or silver-containing material from the porous carbon matrix.

Any technique known in the art can be employed to form the co-crystallite which affords uniform co-crystallization, that is, simultaneous crystallization, of the carbon precursor and the precursor of the silver or silver-containing material and the formation of a substantially uniform co-crystallite thereof. Homogeneity of the co-crystallite mixture may assist in the ultimate formation of a uniform dispersion of the silver or silver-containing material in high surface area active carbon. An exemplary technique to form the uniform co-crystallite of the carbon precursor and precursor of the silver or silver-containing material involves the formation of a stable solution of both such precursors in a suitable solvent and spray drying such solution to dryness. In such technique, solvent removal may be carried out rapidly enough to maximize rapid, simultaneous and homogeneous co-crystallization of both precursors from solution. Spray drying may provide the desired rapid evaporation to insure rapid, simultaneous and uniform co-crystallization and formation of a homogeneous co-crystallite of both precursors.

In one embodiment of a spray drying system which is suitable for use in carrying out the spray drying step to produce the filter material of this invention, a solution of the carbon precursor and of the precursor of the silver or silver-containing material is introduced into a drying chamber through a nozzle. A hot inert gas such as nitrogen may be introduced into the drying chamber through a line which surrounds the nozzle and serves to assist in atomizing the solution entering the drying chamber through the nozzle, to accelerate and raise the temperature of the atomized solution droplets and thereby to promote substantially instantaneous evaporation of solvent therefrom to afford a homogeneous co-crystallite powder. Air is introduced into the drying chamber to sweep the co-crystallite powder and nitrogen downward in the drying chamber where the bulk of the co-crystallite powder falls to the bottom of the drying chamber, where it collects and from which it is later removed for use in the subsequent steps. Gas passes from the drying chamber and then to a cyclone system where co-crystallite powder entrained in the gas stream is separated from the gas and passes downward through a line for collection. The weight ratio of the dispersed metal or metal-containing material-to-the active carbon matrix in the composition of this invention may be from 1:10,000 to 1:1, based on the weight of the metal or metal-containing material, respectively.

IV. Treatment Examples

Example 1

Figure 3A:
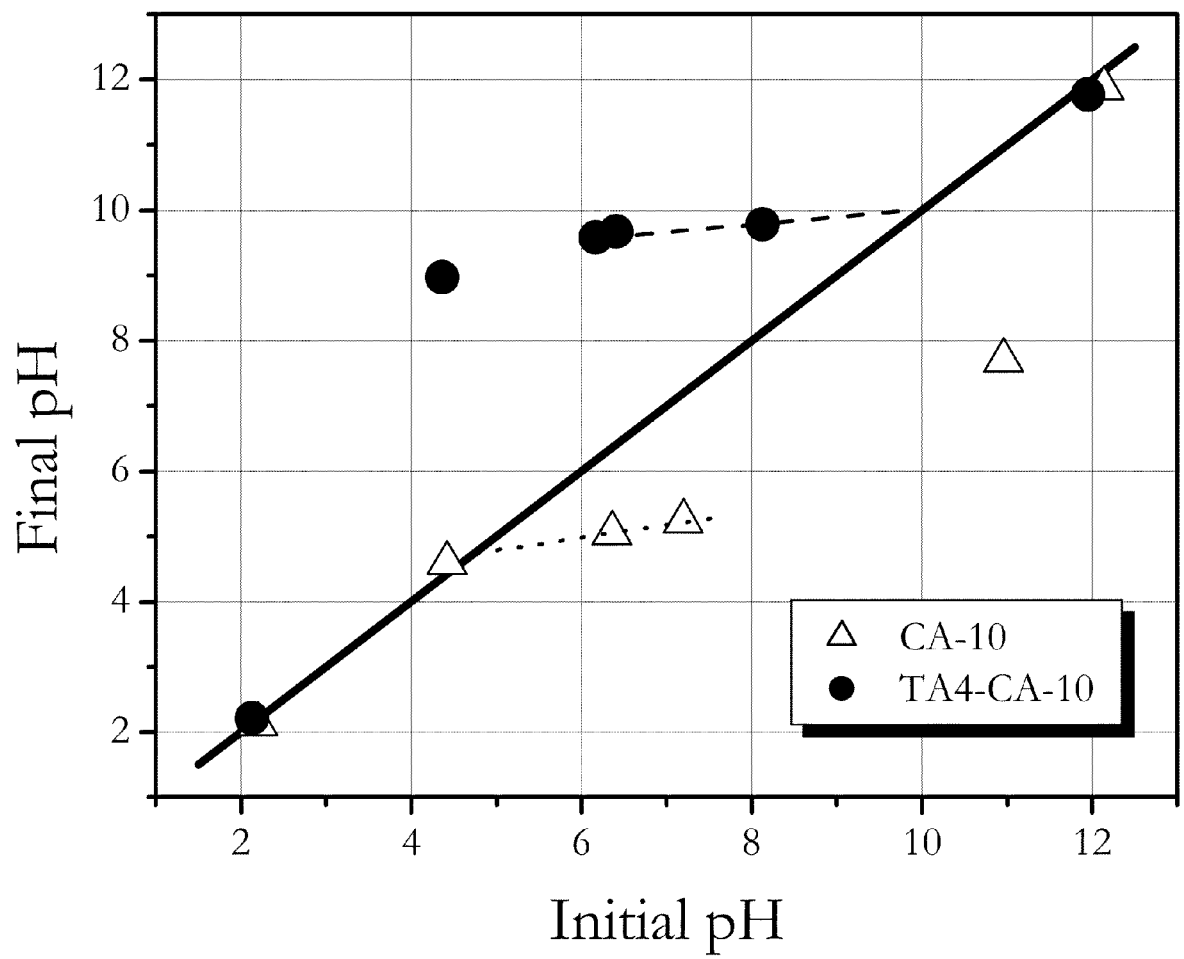

Treatment of a Mesoporous and Acidic Activated Carbon to Produce a Mesoporous, Basic, and Reduced-Oxygen Activated Carbon About 2 kg of the CARBOCHEM® CA-10 mesoporous and acidic wood-based activated carbon particles from Carbochem, Inc., of Ardmore, Pa., are placed on the belt of a furnace Model BAC-M manufactured by C. I. Hayes, Inc., of Cranston, R.I. The furnace temperature is set to about 950° C., the treatment time is about 4 hours, and the atmosphere is dissociated ammonia flowing with a volumetric flow rate of about 12,800 standard L/h (i.e., about 450 standard ft$^3$/h, or equivalently, about 6.4 standard L/h·g). The treated activated carbon particles are called TA4-CA-10, and their BET isotherm, mesopore volume distribution, and point of zero charge analyses are illustrated in FIGS. 1a, 2a, and 3a, respectively. Numerical values for BET, the sum of mesopore and macropore volumes, point of zero charge, BRI/BLRI, VRI/VLRI, bulk oxygen percentage by weight, and ORP are shown in Section VII.

Example 2

Figure 3B:
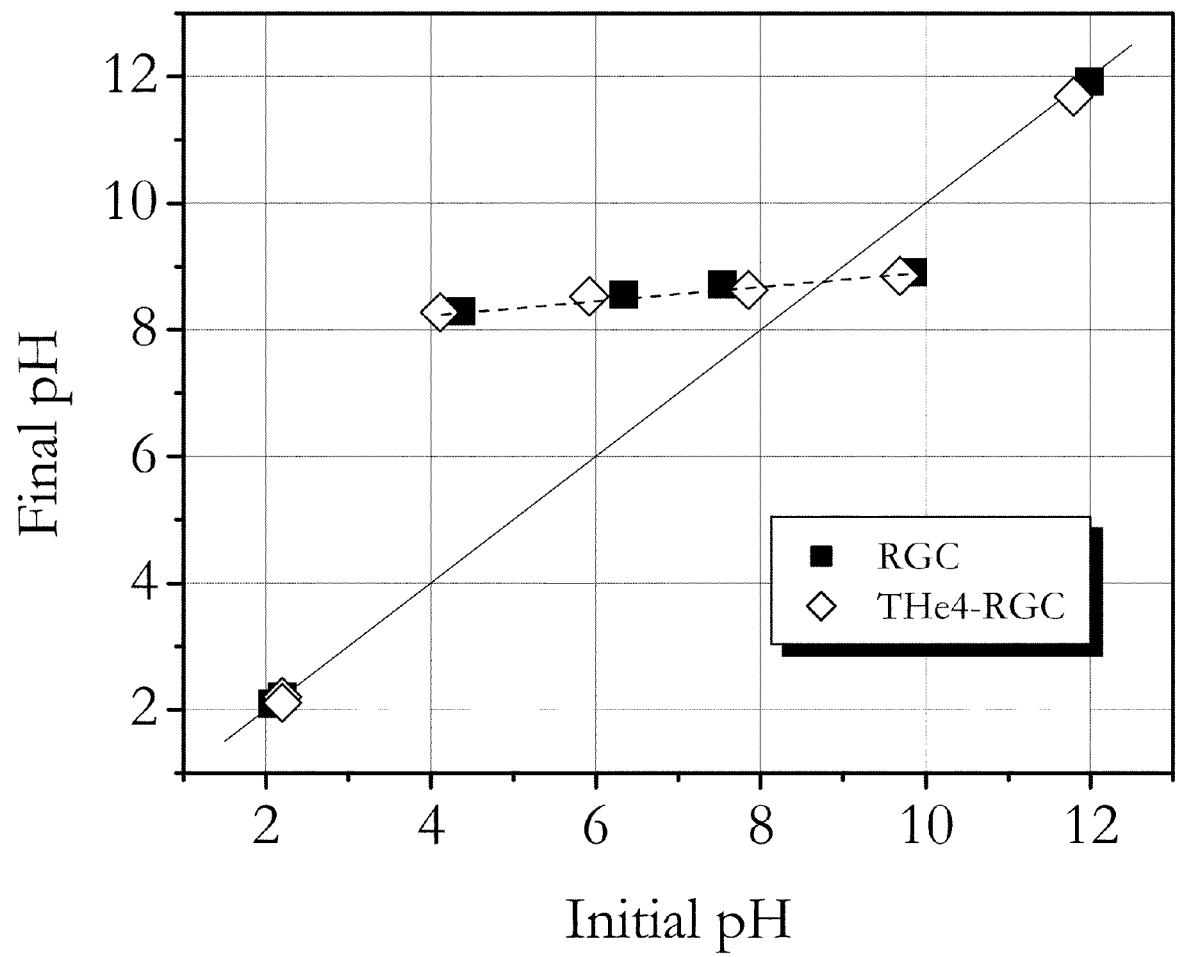
FIG. 3b is a point-of-zero-charge graph of the particles of FIG. 1b.

Treatment of a Mesoporous and Basic Activated Carbon to Produce a Mesoporous, Basic, and Reduced-Oxygen Activated Carbon About 2 kg of the MeadWestvaco Nuchar® RGC mesoporous and basic wood-based activated carbon particles from MeadWestvaco Corp., of Covington, Va., are placed on the belt of a furnace Model BAC-M manufactured by C. I. Hayes, Inc., of Cranston, R.I. The furnace temperature is set to about 800° C., the treatment time is 4 hours, and the atmosphere is helium flowing with a volumetric flow rate of about 12,800 standard L/h (i.e., about 450 standard ft$^3$/h, or equivalently, about 6.4 standard L/h·g). The treated activated carbon particles are called THe-4-RGC, and their BET isotherm, mesopore volume distribution, and point of zero charge analyses are illustrated in FIGS. 1b, 2b, and 3b, respectively. Numerical values for BET, the sum of mesopore and macropore volumes, point of zero charge, BRI/BLRI, VRI/VLRI, bulk oxygen percentage by weight, and ORP are shown in Section VII.

V. Exemplary Filters

Figure 4:
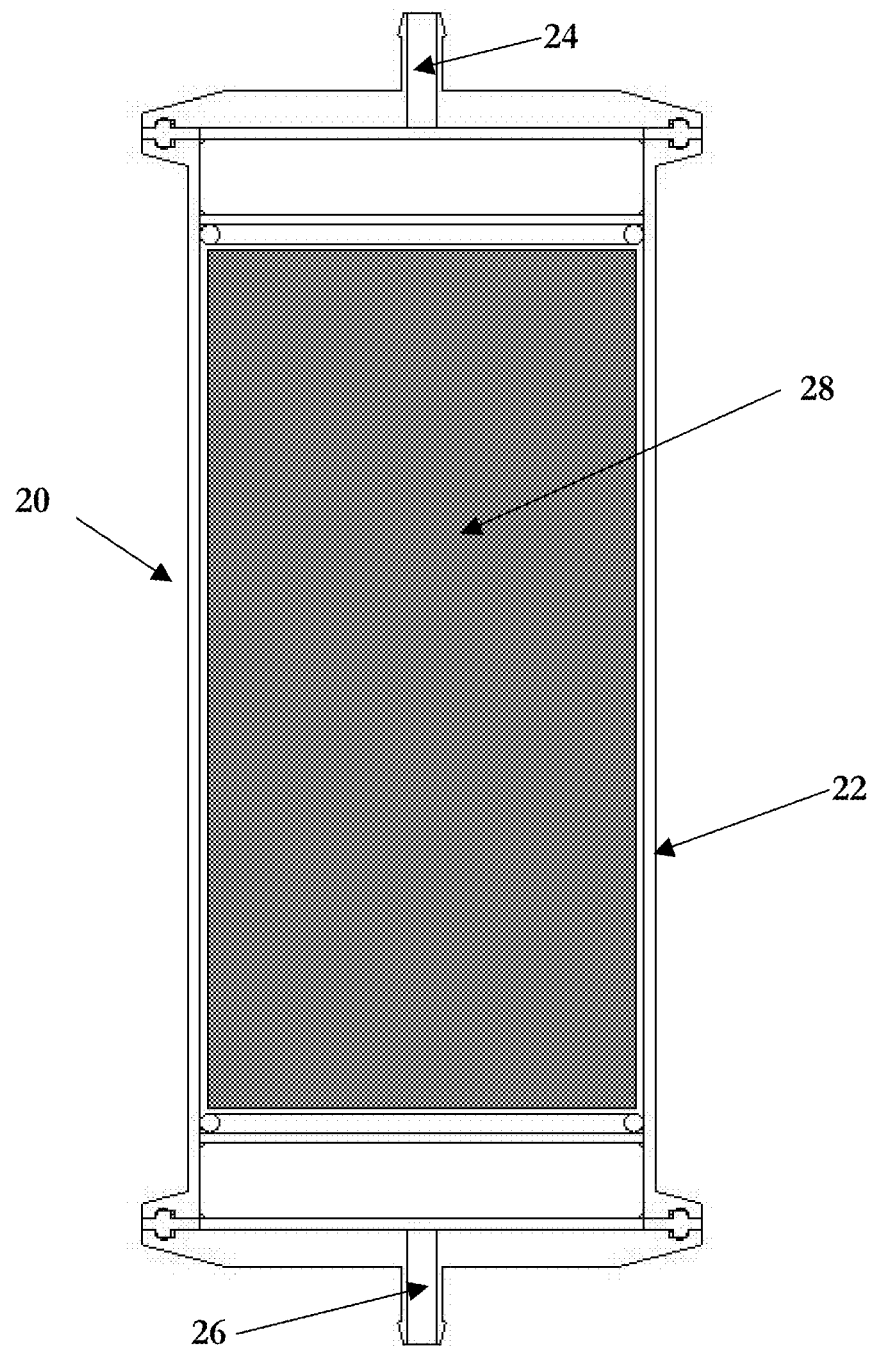
FIG. 4 is a cross sectional side view of an axial flow filter made in accordance with the present invention.

Referring to FIG. 4, the construction of an exemplary filter will now be described. The filter 20 comprises a housing 22 in the form of a cylinder having an inlet 24 and an outlet 26. The housing 22 can be provided in a variety of forms, shapes, sizes, and arrangements depending upon the intended use and desired performance of the filter 20, as known in the art. For example, the filter 20 can be an axial flow filter, wherein the inlet 24 and outlet 26 are disposed so that the liquid flows along the axis of the housing 22. Alternatively, the filter 20 can be a radial flow filter wherein the inlet and outlet are arranged so that the fluid (e.g., either a liquid, gas, or mixture thereof) flows along a radius of the housing 22. Either in axial or radial flow configuration, embodiments of filter 20 may be configured to accommodate a face area of at least about 0.5 in.$^2$ (3.2 cm$^2$), in some embodiments at least about 3 in.$^2$ (19.4 cm$^2$), and in some embodiments at least about 5 in.$^2$ (32.2 cm$^2$), and a filter depth of at least about 0.125 in. (0.32 cm), in some embodiments at least about 0.25 in. (0.64 cm), in some embodiments at least about 0.5 in. (1.27 cm), and in some embodiments at least about 1.5 in. (3.81 cm). For radial flow filters, the filter length may be at least 0.25 in. (0.64 cm), in some embodiments at least about 0.5 in. (1.27 cm), and in some embodiments at least about 1.5 in. (3.81 cm). Still further, embodiments of filter 20 can include both axial and radial flow sections.

The housing of embodiments of filter 20 may also be formed as part of another structure. While some embodiments of the filters are particularly suited for use with water, it will be appreciated that other fluids (e.g., air, gas, and mixtures of air and liquids) can be used. Thus, the filter 20 is intended to represent a generic liquid filter or gas filter. The size, shape, spacing, alignment, and positioning of the inlet 24 and outlet 26 can be selected, as known in the art, to accommodate the flow rate and intended use of the filter 20. In some embodiments, the filter 20 is configured for use in residential or commercial potable water applications, including, but not limited to, whole house filters, refrigerator filters, potable water units (e.g., camping gear, such as water bottles), faucet-mount filters, under-sink filters, medical device filters, industrial filters, air filters, etc. Examples of filter configurations, potable water devices, consumer appliances, and other water filtration devices suitable for use with the present invention are disclosed in U.S. Pat. Nos. 5,527,451, 5,536,394, 5,709,794, 5,882,507, 6,103,114, 4,969,996, 5,431,813, 6,214,224, 5,957,034, 6,145,670, 6,120,685, and 6,241,899, the substances of which are incorporated herein by reference. For potable water applications, embodiments of filter 20 may be configured to accommodate a flow rate of less than about 8 L/min, or less than about 6 L/min, or between about 2 L/min and about 4 L/min, and the filter may contain less than about 2 kg of filter material, or less than about 1 kg of filter material, or less than about 0.5 kg of filter material. Further, for potable water applications, embodiments of the filter 20 may be configured to accommodate an average fluid residence time of at least about 3 s, in some embodiments at least about 5 s, in some embodiments at least about 7 s, in some embodiments at least about 10 s, and in some embodiments at least about 15 s. Still further, for potable water applications, embodiments of the filter 20 may be configured to accommodate a filter material pore volume of at least about 0.4 cm$^3$, in some embodiments at least about 4 cm$^3$, in some embodiments at least about 14 cm$^3$, and in some embodiments at least about 25 cm$^3$.

In some embodiments, the filter 20 may also comprise a filter material 28 which may be used in combination with other filter systems including reverse osmosis systems, ultraviolet light systems, ionic exchange systems, electrolyzed water systems, and other water treatment systems known to those with skill in the art.

In other embodiments, the filter 20 may also comprise a filter material 28, wherein the filter material 28 includes one or more filter particles (e.g., fibers, granules, etc.). One or more of the filter particles can be mesoporous, mesoporous and basic, or mesoporous and basic and reduced oxygen and possess the characteristics previously discussed. The mesoporous; or mesoporous and basic; or mesoporous, basic and reduced oxygen activated carbon filter material 28 can be coated either partially or in its entirety with silver, a silver containing material, or combinations thereof. The mesoporous; or mesoporous and basic; or mesoporous, basic and reduced oxygen activated carbon filter material 28 can be combined with other materials selected from the group consisting of activated carbon powders, activated carbon granules, activated carbon fibers, zeolites, activated alumina, activated magnesia, diatomaceous earth, silver particles, activated silica, hydrotalcites, glass, polyethylene fibers, polypropylene fibers, ethylene maleic anhydride copolymers fibers, sand, clay and mixtures thereof. The other materials can be coated either partially or in their entirety with silver, a silver containing material, or combinations thereof. Examples of filter materials and combinations of filter materials that mesoporous and basic activated carbon may be combined with are disclosed in U.S. Pat. Nos. 6,274,041, 5,679,248, which are herein incorporated by reference, and U.S. patent application Ser. No. 09/628,632, which is herein incorporated by reference. As previously discussed, the filter material can be provided in either a loose or interconnected form (e.g., partially or wholly bonded by a polymeric binder or other means to form an integral structure).

The filter material may be used for different applications (e.g., use as a pre-filter or post-filter) by varying the size, shape, complex formations, charge, porosity, surface structure, functional groups, etc. of the filter particles as discussed above. The filter material may also be mixed with other materials, as just described, to suit it for a particular use. Regardless of whether the filter material is mixed with other materials, it may be used as a loose bed, a block (including a co-extruded block as described in U.S. Pat. No. 5,679,248, which is herein incorporated by reference), and mixtures thereof. Examples of methods that might be used with the filter material include forming a block filter made by ceramic-carbon mix (wherein the binding comes from the firing of the ceramic), using powder between non-wovens as described in U.S. Pat. No. 6,077,588, which is herein incorporated by reference, using the green strength method as described in U.S. Pat. No. 5,928,588, which is herein incorporated by reference, activating the resin binder that forms the block, which is herein incorporated by reference, or by using a resistive heating method as described in PCT Application Serial No. WO 98/43796.

VI. Filter Examples

Example 3

Filter Containing Mesoporous and Basic Activated Carbon Particles

About 18.3 g of Nuchar® RGC mesoporous and basic activated carbon powder (with $D_{V,0.5}$ equal to about 45 µm) from MeadWestvaco Corp. of Covington, Va., is mixed with about 7 g of Microthene® low-density polyethylene (LDPE) FN510-00 binder of Equistar Chemicals, Inc. of Cincinnati, Ohio, and about 2 g of Alusil® 70 aluminosilicate powder from Selecto, Inc., of Norcross, Ga. The mixed powders are then poured into a circular aluminum mold with about 3 in. (about 7.62 cm) internal diameter and about 0.5 in. (about 1.27 cm) depth. The mold is closed and placed in a heated press with platens kept at about 204° C. for 1 h. Then, the mold is allowed to cool to room temperature, opened, and the axial flow filter is removed. The characteristics of the filter are: face area: about 45.6 cm$^2$; filter depth: about 1.27 cm; filter total volume: about 58 mL; filter porosity (for pores greater than about 0.1 µm): about 0.43; and filter material pore volume (for pores greater than about 0.1 µm): about 25 mL (as measured by mercury porosimetry). The filter is placed in the Teflon® housing described in the test procedures below. When the flow rate is about 200 mL/min, the pressure drop of this filter is about 17 psi (about 1.2 bar, 0.12 MPa) for about the first 2,000 filter pore volumes. Numerical values for F-BLR, F-VLR, η, and α are shown in Section VII.

Example 4

Filter Containing Microporous and Basic Activated Carbon Particles

About 26.2 g of coconut microporous and basic activated carbon powder (with $D_{V,0.5}$ equal to about 92 µm) is mixed with 7 g of Microthene® low-density polyethylene (LDPE) FN510-00 binder of Equistar Chemicals, Inc. of Cincinnati, Ohio, and about 2 g of Alusil® 70 aluminosilicate powder from Selecto, Inc., of Norcross, Ga. The mixed powders are then poured into a circular aluminum mold with about 3 in. (about 7.62 cm) internal diameter and about 0.5 in. (about 1.27 cm) depth. The mold is closed and placed in a heated press with platens kept at about 204° C. for 1 h. Then, the mold is allowed to cool to room temperature, is opened, and the axial flow filter is removed. The characteristics of the filter are: face area: about 45.6 $cm^2$; filter depth: about 1.27 cm; filter total volume: about 58 mL; filter porosity (for pores greater than about 0.1 μm): about 0.44; and filter material pore volume (for pores greater than about 0.1 μm): about 25.5 mL (as measured by mercury porosimetry). The filter is placed in the Teflon® housing described in the test procedures below. When the flow rate is about 200 mL/min, the pressure drop of this filter is about 17 psi (about 1.2 bar, about 0.12 MPa) for about the first 2,000 filter pore volumes. Numerical values for F-BLR, F-VLR, η, and α are shown in Section VII.

VII. Test and Calculation Procedures

The following test procedures are used to calculate the BET, point of zero charge, BRI/BLRI, VRI/VLRI, bulk oxygen percentage by weight, ORP, F-BLRI, and F-VLR values discussed herein. Also discussed herein are calculation procedures for single-collector efficiency, filter coefficient, average fluid residence time, and F-BLR.

While measurement of the BRI/BLRI and VRI/VLRI values is with respect to an aqueous medium, this is not intended to limit the ultimate use of filter materials. Accordingly, the filter materials can ultimately be used with other fluids as previously discussed even though the BRI/BLRI and VRI/VLRI values are calculated with respect to an aqueous medium. Further, the filter materials chosen below to illustrate use of the test procedures are not intended to limit the scope of the manufacture and/or composition of the filter materials or to limit which filter materials of the present invention can be evaluated using the test procedures.

BET Test Procedure

The BET specific surface area and pore volume distribution are measured using a nitrogen adsorption technique, such as that described in ASTM D 4820-99, the substance of which is herein incorporated by reference, by multipoint nitrogen adsorption, at about 77K with a Coulter SA3100 Series Surface Area and Pore Size Analyzer manufactured by Coulter Corp., of Miami, Fla. This process can also provide the micropore, mesopore, and macropore volumes. For the TA4-CA-10 filter particles of Example 1, the BET area is about 1,038 $m^2/g$, micropore volume is about 0.43 mL/g, and the sum of the mesopore and macropore volumes is about 0.48 mL/g. For the THe-4-RGC filter particles of Example 2, the BET area is about 2,031 $m^2/g$, micropore volume is about 0.81 mL/g, and the sum of the mesopore and macropore volumes is about 0.68 mL/g. Note that the respective values of the starting materials CA-10 and RGC are: about 1,309 $m^2/g$; about 0.54 mL/g; about 0.67 mL/g; and about 1,745 $m^2/g$; about 0.70 mL/g; about 0.61 mL/g, respectively. BET nitrogen isotherm and the mesopore volume distribution for the filter material of Examples 1 and 2 are illustrated in FIGS. 1a and 1b, respectively. As will be appreciated, other instrumentation can be substituted for the BET measurements as is known in the art.

Point of Zero Charge Test Procedure

About 0.010 M aqueous KCl solution is prepared from reagent grade KCl and water that is freshly distilled under argon gas. The water used for the distillation is deionized by a sequential reverse osmosis and ion exchange treatment. About 25.0 mL volume of the aqueous KCl solution is transferred into six, about 125 mL flasks, each fitted with a 24/40 ground glass stopper. Microliter quantities of standardized aqueous HCl or NaOH solutions are added to each flask so that the initial pH ranges between about 2 and about 12. The pH of each flask is then recorded using an Orion model 420A pH meter with an Orion model 9107BN Triode Combination pH/ATC electrode, manufactured by Thermo Orion Inc., of Beverly, Mass., and is called "initial pH". About 0.0750±0.0010 g of activated carbon particles are added to each of the six flasks, and the aqueous suspensions are stirred (at about 150 rpm) while stoppered for about 24 hours at room temperature before recording the "final pH". FIG. 3a shows the initial and final pH values for the experiments run with CA-10, and TA4-CA-10 activated carbon materials, and FIG. 3b shows the initial and final pH values for the experiments run with RGC and The4-RGC activated carbon materials. The point of zero charge for the CA-10, TA4-CA-10, RGC, and THe4-RGC is about 5.0, about 9.7, about 8.8, and about 8.6, respectively. As will be appreciated, other instrumentation can be substituted for this test procedure as is known in the art.

BRI/BLRI Test Procedure

A PB-900™ Programmable JarTester manufactured by Phipps & Bird, Inc., of Richmond, Va., with 2 or more Pyrex® glass beakers (depending on the numbers of materials tested) is used. The diameter of the beakers is about 11.4 cm (about 4.5") and the height is about 15.3 cm (about 6"). Each beaker contains about 500 mL of dechlorinated, municipally-supplied tap water contaminated with the $E.\ coli$ microorganisms and a stirrer that is rotated at about 60 rpm. The stirrers are stainless steel paddles about 7.6 cm (about 3") in length, about 2.54 cm (about 1") in height, and about 0.24 cm (about $\frac{3}{32}$") in thickness. The stirrers are placed about 0.5 cm (about $\frac{3}{16}$") from the bottom of the beakers. The first beaker contains no filter material and is used as a control, and the other beakers contain sufficient quantity of the filter materials, having a Sauter mean diameter less than about 55 μm, so that the total external geometric surface area of the materials in the beakers is about 1400 $cm^2$. This Sauter mean diameter is achieved by a) sieving samples with broad size distribution and higher Sauter mean diameter or b) reducing the size of the filter particles (e.g., if the filter particles are larger than about 55 μm or if the filter material is in an integrated or bonded form) by any size-reducing techniques that are well known to those skilled in the art. For example, and by no way of limitation, size-reducing techniques include crushing, grinding, and milling. Equipment utilized for size reduction may include jaw crushers, gyratory crushers, roll crushers, shredders, heavy-duty impact mills, media mills, and fluid-energy mills, such as centrifugal jets, opposed jets or jets with anvils. The size reduction can be used on loose or bonded filter particles. Any biocidal coating on the filter particles or the filter material should be removed before conducting this test. Alternatively, uncoated filter particles can be substituted for this test.

Duplicate samples of water, each about 5 mL in volume, are collected from each beaker for assay at various times after insertion of the filter particles in the beakers until equilibrium is achieved in the beakers that contain the filter particles. Typical sample times are: about 0, about 2, about 4 and about 6 hours. Other equipment can be substituted as known in the art.

The $E.\ coli$ bacteria used are the ATCC # 25922 (American Type Culture Collection, Rockville, Md.). The target $E.\ coli$ concentration in the control beaker is set to be about $3.7 \times 10^9$ CFU/L. The $E.\ coli$ assay can be conducted using the membrane filter technique according to process # 9222 of the 20th edition of the "Standard Processes for the Examination of Water and Wastewater" published by the American Public Health Association (APHA), Washington, D.C., the substance of which is herein incorporated by reference. The limit of detection (LOD) is about $1\times10^3$ CFU/L.

Figure 5A:
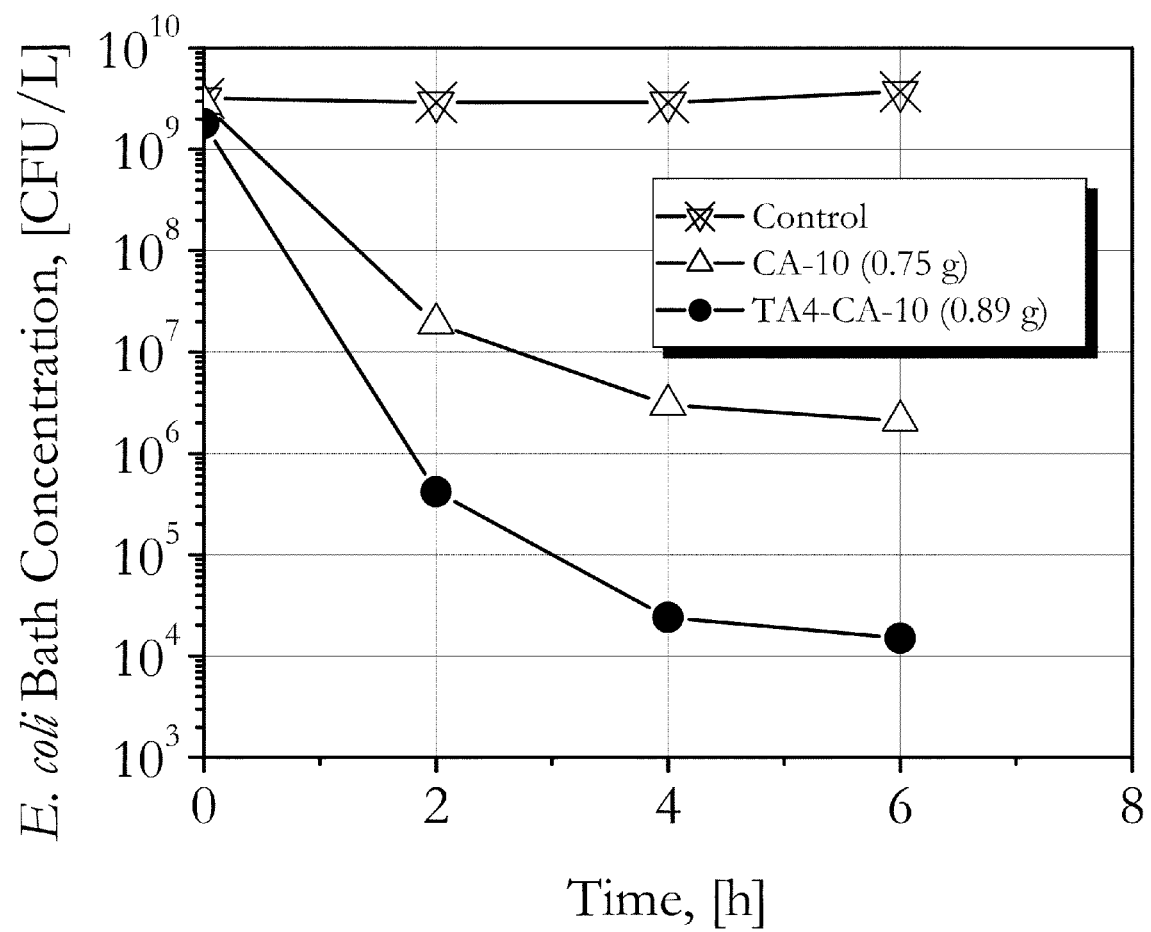
Figure 5B:
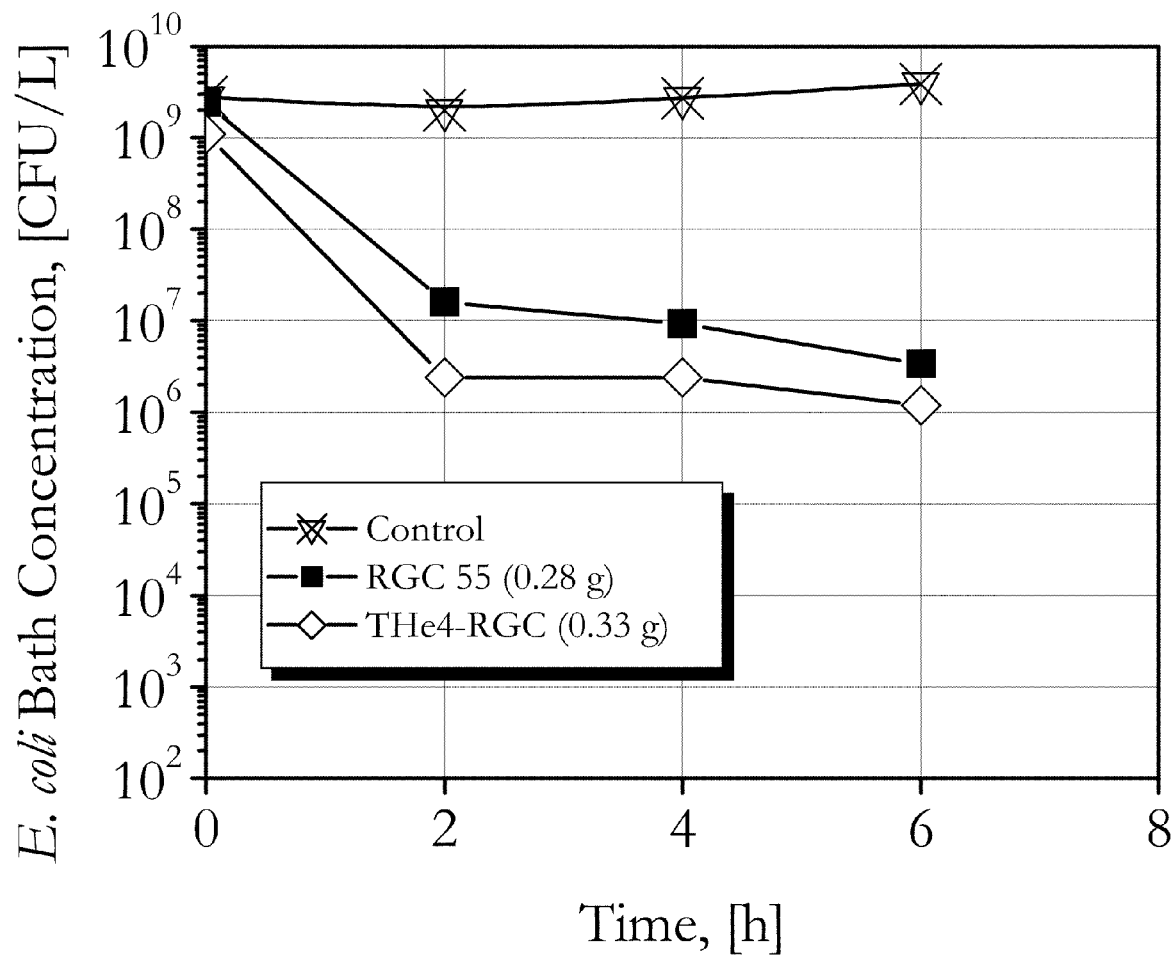
FIG. 5b illustrates the E. coli bath concentration as a function of time for activated carbon particles of FIG. 1b.

Exemplary BRI/BLRI results for the filter materials of Examples 1 and 2 are shown in FIG. 5a and FIG. 5b. The amount of the CA-10 mesoporous and acidic activated carbon material is about 0.75 g, and that of the TA40-CA-10 mesoporous, basic, and reduced-oxygen activated carbon material is about 0.89 g. The amount of the RGC mesoporous and basic activated carbon material is about 0.28 g, and that of the THe-4-RGC mesoporous, basic, and reduced-oxygen activated carbon material is about 0.33 g. All four amounts correspond to about 1,400 cm² external surface area. The E. coli concentration in the control beaker in FIG. 5a is about $3.7\times10^9$ CFU/L, and that in FIG. 5b is about $3.2\times10^9$ CFU/L. The E. coli concentrations in the beakers containing the CA-10, TA4-CA-10, RGC, and THe-4-RGC samples reach equilibrium in about 6 hours, and their values are: about $2.1\times10^6$ CFU/L, about $1.5\times10^4$ CFU/L, about $3.4\times10^6$ CFU/L, and about $1.2\times10^6$ CFU/L, respectively. Then, the respective BRIs are calculated as about 99.94%, about 99.9996%, about 99.91%, and about 99.97%, and the respective BLRIs are calculated as about 3.2 log, about 5.4 log, about 3.0 log, and about 3.5 log.

VRI/VLRI Test Procedure

The testing equipment and the procedure are the same as in BRI/BLRI procedure. The first beaker contains no filter material and is used as control, and the other beakers contain a sufficient quantity of the filter materials, having a Sauter mean diameter less than about 55 µm, so that there is a total external geometric surface area of about 1400 cm² in the beakers. Any biocidal coating on the filter particles or the filter material should be removed before conducting this test. Alternatively, uncoated filter particles or filter material can be substituted for this test.

The MS-2 bacteriophages used are the ATCC # 15597B from the American Type Culture Collection of Rockville, Md. The target MS-2 concentration in the control beaker is set to be about $2.07\times10^9$ PFU/L. The MS-2 can be assayed according to the procedure by C. J. Hurst, *Appl. Environ. Microbiol.*, 60(9), 3462 (1994), the substance of which is herein incorporated by reference. Other assays known in the art can be substituted. The limit of detection (LOD) is about $1\times10^3$ PFU/L.

Figure 6A:
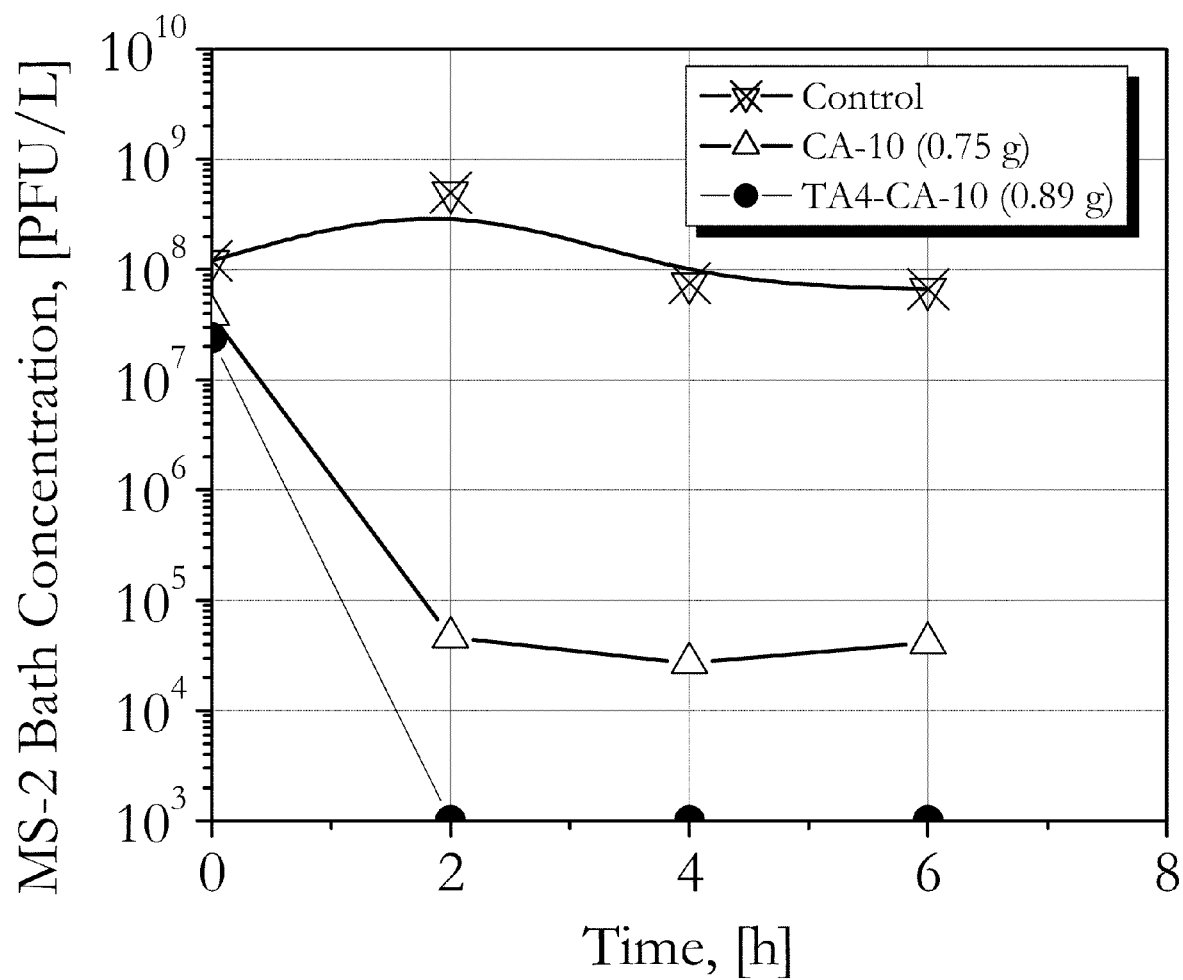
Figure 6B:
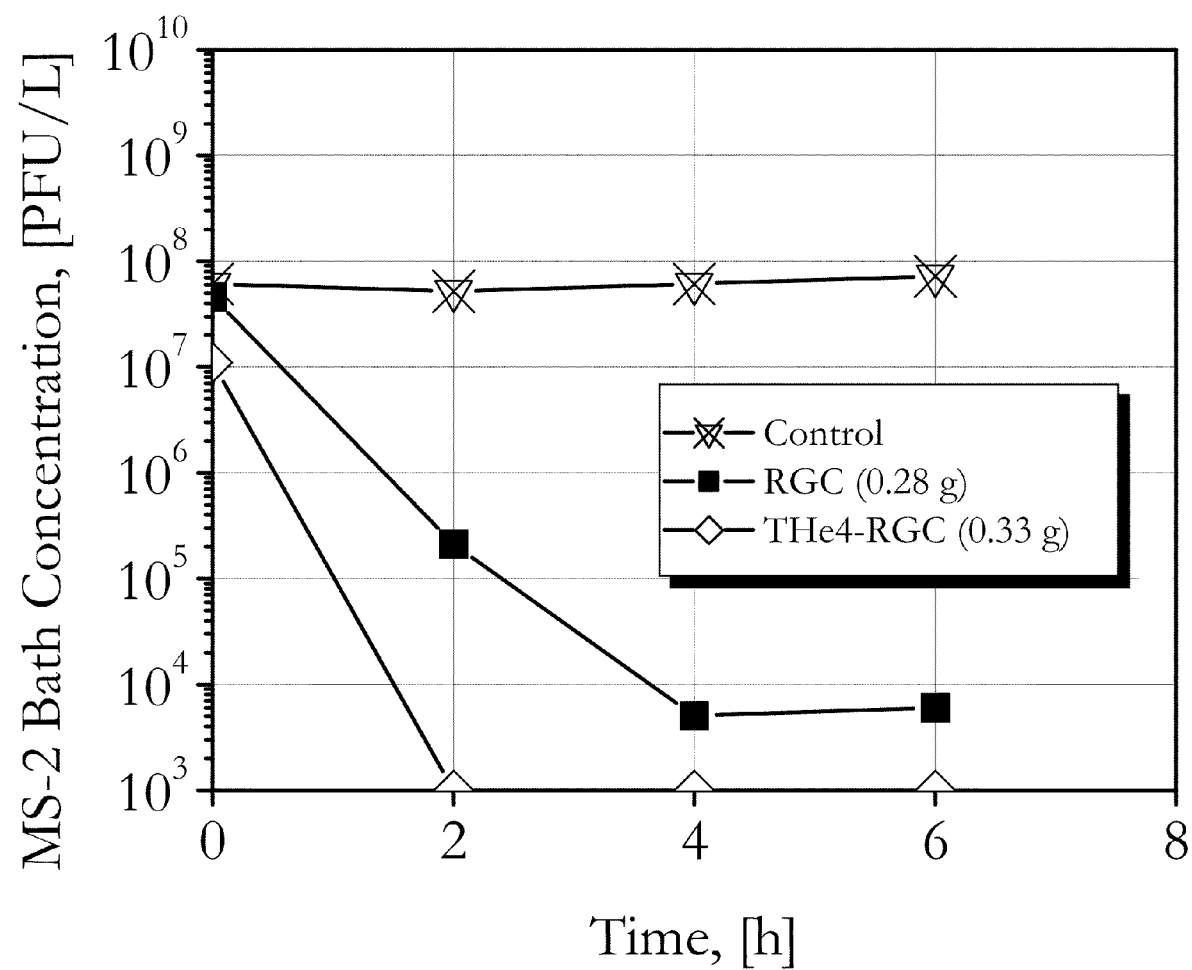
FIG. 6b illustrates the MS-2 bath concentration as a function of time for the activated carbon particles of FIG. 1b.

Exemplary VRI/VLRI results for the filter materials of Examples 1 and 2 are shown in FIG. 6a and FIG. 6b. The amount of the CA-10 mesoporous and acidic activated carbon material is about 0.75 g, and that of the TA40-CA-10 mesoporous, basic, and reduced-oxygen activated carbon material is about 0.89 g. The amount of the RGC mesoporous and basic activated carbon material is about 0.28 g, and that of the THe-4-RGC mesoporous, basic, and reduced-oxygen activated carbon material is about 0.33 g. All four amounts correspond to about 1,400 cm² external surface area. The MS-2 concentration in the control beaker in FIG. 6a is about $6.7\times10^7$ PFU/L, and that in FIG. 6b is about $8.0\times10^7$ PFU/L. The MS-2 concentrations in the beakers containing the CA-10, TA4-CA-10, RGC, and THe-4-RGC samples reach equilibrium in 6 hours, and their values are about $4.1\times10^4$ PFU/L, about $1\times10^3$ PFU/L, about $3\times10^3$ PFU/L, and less than about $1.0\times10^3$ PFU/L (limit of detection), respectively. Then, the respective VRIs are calculated as about 99.94%, about 99.999%, about 99.996%, and >about 99.999%, and the respective VLRIs are calculated as about 3.2 log, about 5 log, about 4.4 log, and >about 5 log.

Bulk Oxygen Percentage by Weight Test Procedure

The bulk oxygen percentage by weight is measured using the PerkinElmer Model 240 Elemental Analyzer (Oxygen Modification; PerkinElmer, Inc.; Wellesley, Mass.). The technique is based on pyrolysis of the sample in a stream of helium at about 1000° C. over platinized carbon. The carbon samples are dried overnight in a vacuum oven at about 100° C. As will be appreciated, other instrumentation can be substituted for this test procedure as is known in the art. Exemplary bulk oxygen percentage by weight values for the filter materials CA-10, TA4-CA-10, RGC and THe-4-RGC are about 8.3%, about 1.1%, about 2.3%, and about 0.8%, respectively.

ORP Test Procedure

The ORP is measured using the platinum redox electrode Model 96-78-00 from Orion Research, Inc. (Beverly, Mass.), and following the ASTM standard D 1498-93. The procedure involves the suspension of about 0.2 g of carbon in about 80 mL of tap water, and reading the electrode reading, in mV, after about 5 min of gentle stirring. As will be appreciated, other instrumentation can be substituted for this test procedure as is known in the art. Exemplary ORP values for the filter materials CA-10, TA4-CA-10, RGC and THe-4-RGC are about 427 mV, about 285 mV, about 317 mV, and about 310 mV, respectively.

F-BLR Test Procedure

The housings for the axial flow filters with mesoporous carbon are made from Teflon® and consist of 2 parts, i.e., a lid and a base. Both parts have an outside diameter of about 12.71 cm (about 5") and inside diameter of about 7.623 cm (about 3"). The lid counter sets in the base with an o-ring (about 3" ID and about ⅛" thickness) compression seal. The inlet and outlet hose barb connectors are threaded into the lid and base with about 1/16" NPT pipe threads. About ½" thick by about 2¾" OD stainless steel diverter (with about 3/16" hole on the upstream side and about 6 mesh screen on the downstream side) is counter set into the lid of the housing. The function of the diverter is to distribute the inlet flow over the entire face of the filter. The lid and base of the housing engage such that a compression seal exists sealing the filter within the housing. The lid and the base held together using four about ¼" fasteners.

The filter is mounted inside the housing and water contaminated with about $1\times10^8$ CFU/L E. coli flows through at a flow rate of about 200 mL/min. The total amount of water flowing in can be about 2,000 filter material pore volumes or more. The E. coli bacteria used are the ATCC # 25922 (American Type Culture Collection, Rockville, Md.). The E. coli assay can be conducted using the membrane filter technique according to process # 9222 of the 20th edition of the "Standard Processes for the Examination of Water and Wastewater" published by the American Public Health Association (APHA), Washington, D.C., the substance of which is herein incorporated by reference. Other assays known in the art can be substituted (e.g. COLILERT®). The limit of detection (LOD) is about $1\times10^2$ CFU/L when measured by the membrane filter technique, and about 10 CFU/L when measured by the COLILERT® technique. Effluent water is collected after the flow of about the first 2,000 filter material pore volumes, assayed to count the E. coli bacteria present, and the F-BLR is calculated using the definition.

Figure 7A:
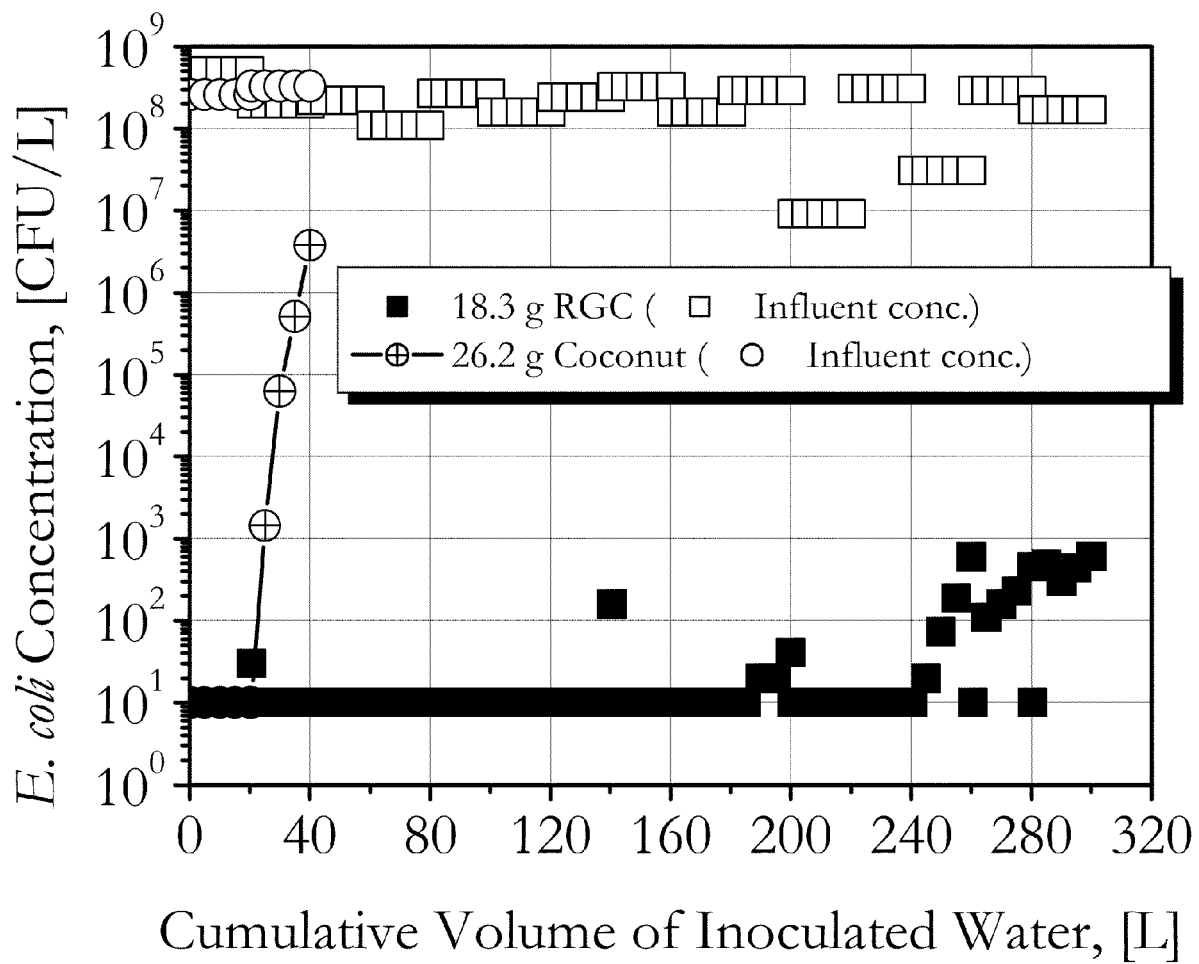
FIG. 7a illustrates the E. coli flow concentration as a function of the cumulative volume of water through 2 filters; one containing RGC mesoporous and basic activated carbon, and the other containing coconut microporous activated carbon particles.

Exemplary results used to calculate F-BLR are shown in FIG. 7a for the axial flow filters of Example 3 and Example 4. The flow rate used in FIG. 7a is about 200 mL/min and the influent concentration of E. coli varied between about $1\times10^8$ and about $1\times10^9$ CFU/L. The filters are challenged with about 20 L once a week (every Tuesday) and the effluent water is assayed as described above. The average fluid residence time for the RGC filter is about 7.5 s, and that of the coconut filter is about 7.65 s. The F-BLR of the RGC filter of Example 3 is calculated as about 6.8 log. For the coconut filter of the Example 4 the collection of the effluent water is stopped at about 40 L (which is equivalent to about 1,570 filter material pore volumes) as the filter shows almost complete breakthrough at that volume of water. The F-BLR is calculated as about 1.9 log at about 1,570 filter material pore volumes.

F-VLR Test Procedure

The housings for the axial flow filters with mesoporous carbon are the same as those described in the F-BLR procedure above. Water contaminated with about $1\times10^7$ PFU/L MS-2 flows through a housing/filter system at a flowrate of about 200 mL/min. The total amount of water flowing in can be about 2,000 filter material pore volumes or more. The MS-2 bacteriophages used are the ATCC # 15597B (American Type Culture Collection, Rockville, Md.). The MS-2 assay can be conducted according to the procedure by C. J. Hurst, *Appl. Environ. Microbiol.*, 60(9), 3462 (1994), the substance of which is herein incorporated by reference. Other assays known in the art can be substituted. The limit of detection (LOD) is $1\times10^3$ PFU/L. Effluent water is collected after the flow of about the first 2,000 filter material pore volumes, assayed to count the MS-2 bacteriophages present, and the F-VLR is calculated using the definition.

Figure 7B:
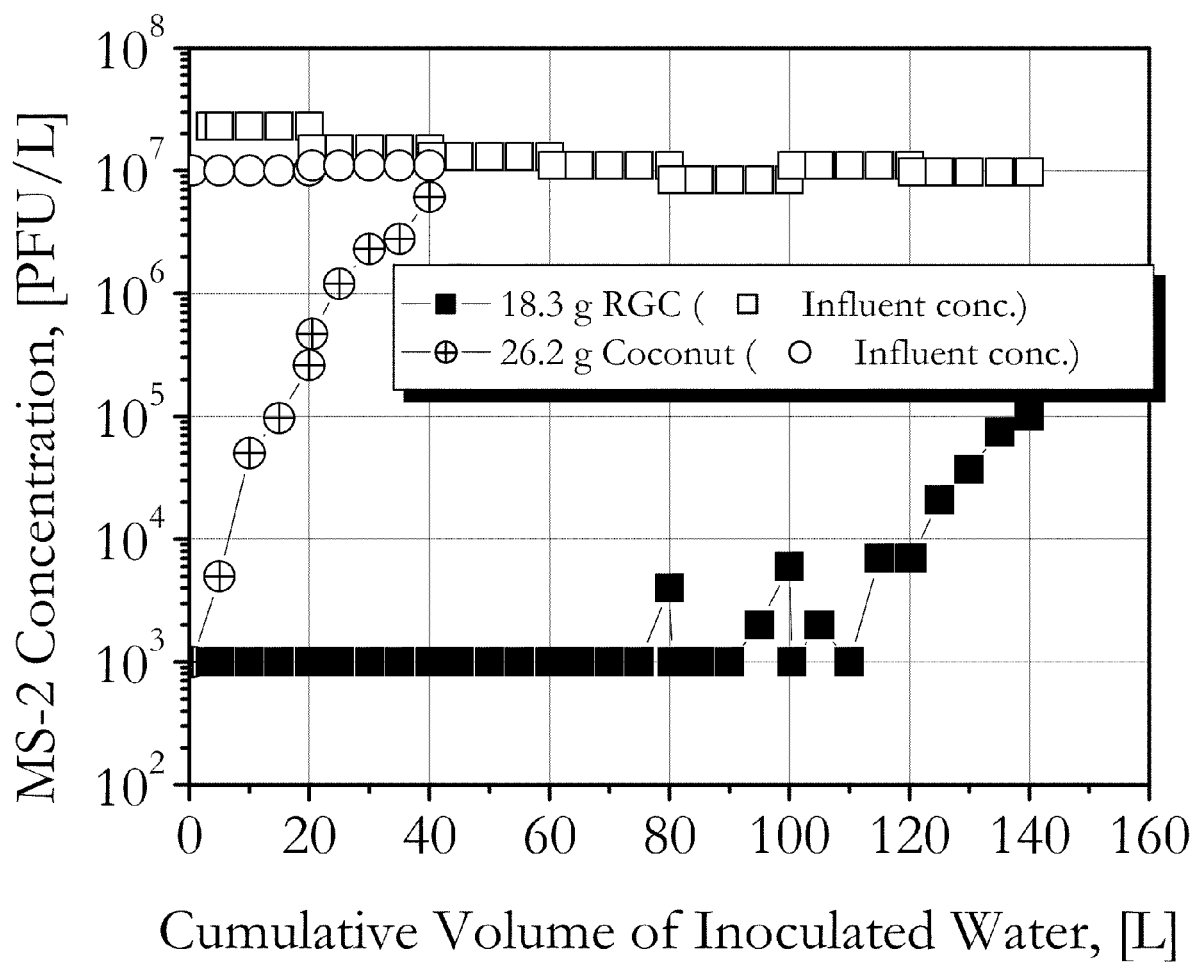
FIG. 7b illustrates the MS-2 flow concentration as a function of the cumulative volume of water through of 2 filters; one containing RGC mesoporous and basic activated carbon, and the other containing coconut microporous activated carbon particles.

Exemplary results used to calculate F-VLR are shown in FIG. 7b for the axial flow filters of Example 3 and Example 4. The flowrate used in FIG. 7b is about 200 mL/min and the influent concentration of MS-2 varied around about $1\times10^7$ PFU/L. The filters are challenged with about 20 L once a week (every Tuesday) and the effluent water is assayed as described above. The F-VLR of the RGC filter of Example 3 is calculated as >about 4.2 log. For the coconut filter of the Example 4 the collection of the effluent water is stopped at about 40 L (which is equivalent to about 1,570 filter material pore volumes) as the filter shows almost complete breakthrough at that volume of water. The F-BLR is calculated as about 0.3 log at about 1,570 filter material pore volumes.

Calculation Procedures for Single-Collector Efficiency, Filter Coefficient, Average Fluid Residence Time, and F-BLR The single-collector efficiency calculation for the filters uses Equation 4 and the dimensionless numbers described after that equation. Exemplary calculations for the axial flow RGC filter of Example 3 using the following parameters: $\epsilon=0.43$, $d_m=1$ μm, $d_c=45$ μm, $H=10^{-20}$ J, $\rho_m=1.058$ g/mL, $\rho_f=1.0$ g/mL, $\mu=1$ mPa·s, $T=298$ K, water flowrate $Q=200$ mL/min, filter diameter $D=7.623$ cm, and $U=0.0007$ m/s, give $\eta=0.01864$. For the same parameters and for $\alpha=1$, the filter coefficient is calculated according to Equation 2 as: $\lambda=354.2$ m$^{-1}$. Furthermore, the F-BLR of the same filter is calculated according to Equation 3 as about 1.95 log. Similar exemplary calculations for the coconut filter of Example 4, using the same parameters as above, give $\eta 7=0.00717$ and $\lambda=65.5$ m$^{-1}$. Finally, the F-BLR of the same filter is calculated according to Equation 3 as about 0.36 log.

The present invention may additionally include information that will communicate to the consumer, by words and/or by pictures, that use of carbon filter particles and/or filter material of the present invention will provide benefits which include removal of microorganisms, and this information may include the claim of superiority over other filter products. In one embodiment, the information may include that use of the invention provides for reduced levels of nano-sized microorganisms. Accordingly, the use of packages in association with information that will communicate to the consumer, by words and or by pictures, that use of the invention will provide benefits such as potable, or more potable water as discussed herein, is important. The information can include, e.g., advertising in all of the usual media, as well as statements and icons on the package, or the filter itself, to inform the consumer.

All documents cited in the Detailed Description of the Invention are, in relevant part, incorporated herein by reference, the citation of any document is not to be construed as an admission that it is prior art with respect to the present invention.

The embodiments described herein were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method of providing portable water, comprising:
   (a) providing a filter comprising a housing having an inlet and an outlet and a filter material disposed within the housing, the filter material formed at least in part from a plurality of filter particles consisting of mesoporous activated carbon, wherein at least a portion of the plurality of filter particles is at least partially coated with silver or a silver-containing material, and wherein:
      (i) a sum of mesopore and macropore volumes of the filter particles is between about 0.2 mL/g and about 2 mL/g; wherein mesopore means an intra-particle pore having a diameter between 2 nm and 50 nm, and macropore means an intra-particle pore having a diameter greater than 50 nm,
      (ii) a total pore volume of the filter particles is greater than about 0.4 mL/g and less than about 3 mL/g, and
      (iii) a ratio of the sum of the mesopore and macropore volumes to the total pore volume of the filter particles is greater than about 0.3;
   (b) passing water through the filter; and
   (c) removing bacteria and viruses from the water with the filter at a level of Filter Bacteria Log Removal of greater than about 2 logs and a Filter Viruses Log Removal of greater than about 1 log.

2. The method of claim 1, wherein the sum of the mesopore and the macropore volumes of the plurality of filter particles is greater than about 0.4 mL/g and less than about 2 mL/g.

3. The method of claim 2, wherein the sum of the mesopore and macropore volumes of the plurality of filter particles is greater than about 0.4 mL/g and less than about 1 mL/g.

4. The method of claim 1, wherein the filter material has a single-collector efficiency, $\eta$, of between about 0.005 and about 0.25, and a filter coefficient, $\lambda$, between about 40 m$^{-1}$ and about 14,000 m$^{-1}$.

5. The method of claim 1, wherein the plurality of filter particles are basic and have a point of zero charge between about 9 and about 12, an Oxidation Reduction Potential between about 290 mV and about 175 mV.

6. The method of claim 1, wherein the total pore volume of the filter particles is greater than about 0.4 mL/g and less than about 2 mL/g.

7. The method of claim 1, wherein the pore volume is at least 0.03 mL/g for pore diameters between about 4 nm and about 6 nm.

8. The method of claim 1, wherein the step of removing the bacteria and viruses from the water comprises removing bacteria and viruses with the filter at a level of Filter Bacteria Log Removal of greater than about 4 logs and a Filter Viruses Log Removal of greater than about 2 logs.

9. The method of claim 8, wherein the step of removing the bacteria and viruses from the water comprises removing bacteria and viruses with the filter at a level of Filter Bacteria Log Removal of greater than about 6 logs and a Filter Viruses Log Removal of greater than about 4 logs.

10. The method of claim 1, wherein the filter has a single-collector efficiency, $\eta$, of greater than about 0.002.

11. The method of claim 1, wherein the filter particles are wood-based activated carbon particles having a Brunauer, Emmet, and Teller (BET) specific surface area between about 1,000 $m^2/g$ and about 2,000 $m^2/g$, the total pore volume is between about 0.8 mL/g and about 2 mL/g, and the sum of the mesopore and macropore volumes is between about 0.4 mL/g and about 1.5 mL/g.

12. A method of providing potable water, comprising:
  (a) providing a filter comprising a housing having an inlet and an outlet and a filter material disposed within the housing, the filter material formed at least in part from a plurality of filter particles consisting of mesoporous activated carbon and other materials selected from the group consisting of activated carbon powders, activated carbon granules, activated carbon fibers, zeolites, activated alumina, activated magnesia, diatomaceous earth, activated silica, hydrotalcites, glass, polyethylene fibers, polypropylene fibers, ethylene maleic anhydride copolymers fibers, sand, clay and mixtures thereof, wherein at least a portion of the other materials are coated with silver or a silver-containing material, and wherein:
    (i) a sum of mesopore and macropore volumes of the filter particles is between about 0.2 mL/g and about 2 mL/g; wherein mesopore means an intra-particle pore having a diameter between 2 nm and 50 nm, and macropore means an intra-particle pore having a diameter greater than 50 nm,
    (ii) a total pore volume of the filter particles is greater than about 0.4 mL/g and less than about 3 mL/g, and
    (iii) a ratio of the sum of the mesopore and macropore volumes to the total pore volume of the filter particles is greater than about 0.3;
  (b) passing water through the filter; and
  (c) removing bacteria and viruses from the water with the filter at a level of Filter Bacteria Log Removal of greater than about 2 logs and a Filter Viruses Log Removal of greater than about 1 log.

13. The method of claim 12, wherein the sum of the mesopore and the macropore volumes of the plurality of filter particles is greater than about 0.4 mL/g and less than about 2 mL/g.

14. The method of claim 13, wherein the sum of the mesopore and macropore volumes of the plurality of filter particles is greater than about 0.4 mL/g and less than about 1 mL/g.

15. The method of claim 12, wherein the step of removing the bacteria and viruses from the water comprises removing bacteria and viruses with the filter at a level of Filter Bacteria Log Removal of greater than about 4 logs and a Filter Viruses Log Removal of greater than about 2 logs.

16. The method of claim 15, wherein the step of removing the bacteria and viruses from the water comprises removing bacteria and viruses with the filter at a level of Filter Bacteria Log Removal of greater than about 6 logs and a Filter Viruses Log Removal of greater than about 4 logs.

17. A method of providing potable water, comprising:
  (a) providing a filter comprising a housing having an inlet and an outlet and a filter material disposed within the housing, the filter material formed at least in part from a plurality of filter particles consisting of mesoporous activated carbon, wherein at least a portion of the plurality of filter particles is at least partially coated with silver or a silver-containing material, and wherein:
    (i) a sum of mesopore and macropore volumes of the filter particles is between about 0.2 mL/g and about 2 mL/g; wherein mesopore means an intra-particle pore having a diameter between 2 nm and 50 nm, and macropore means an intra-particle pore having a diameter greater than 50 nm,
    (ii) a total pore volume of the filter particles is greater than about 0.4 mL/g and less than about 3 mL/g,
    (iii) a ratio of the sum of the mesopore and macropore volumes to the total pore volume of the filter particles is greater than about 0.3, and
    (iv) the filter has a single-collector efficiency, $\eta$, of from about 0.005 to about 0.25;
  (b) directing water through the filter; and
  (c) removing bacteria and viruses from the water with the filter at a level of Filter Bacteria Log Removal of greater than about 2 logs and a Filter Viruses Log Removal of greater than about 1 log.

18. The method of claim 17, wherein the sum of the mesopore and the macropore volumes of the plurality of filter particles is greater than about 0.4 mL/g and less than about 2 mL/g.

19. The method of claim 17, wherein the step of removing the bacteria and viruses from the water comprises removing bacteria and viruses with the filter at a level of Filter Bacteria Log Removal of greater than about 6 logs and a Filter Viruses Log Removal of greater than about 4 logs.

20. The method of claim 1, further comprising a step of informing a user that the filter may be used to remove microorganisms.

* * * * *